(12) United States Patent
Tang

(10) Patent No.: US 11,576,087 B2
(45) Date of Patent: Feb. 7, 2023

(54) METHOD FOR NETWORK HANDOVER AND RETURNING AFTER NETWORK HANDOVER, ACCESS NETWORK DEVICE AND CORE NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/845,573

(22) Filed: Apr. 10, 2020

(65) Prior Publication Data

US 2020/0252839 A1    Aug. 6, 2020

Related U.S. Application Data

(63) Continuation of application No. PCT/CN2018/076552, filed on Feb. 12, 2018.

(30) Foreign Application Priority Data

Oct. 11, 2017   (WO) ................ PCT/CN2017/105768
Oct. 17, 2017   (WO) ................ PCT/CN2017/106598

(51) Int. Cl.
*H04W 36/00*  (2009.01)
*H04W 76/11*  (2018.01)
(Continued)

(52) U.S. Cl.
CPC ......... *H04W 36/0022* (2013.01); *H04W 8/08* (2013.01); *H04W 36/32* (2013.01);
(Continued)

(58) Field of Classification Search
CPC ... H04W 36/0022; H04W 76/11; H04W 8/08; H04W 36/32; H04W 48/16; H04W 80/10;
(Continued)

(56) References Cited

U.S. PATENT DOCUMENTS

2012/0120789 A1   5/2012 Ramachandran et al.
2016/0183156 A1*  6/2016 Chin ................... H04L 61/2007
                                                    370/331
(Continued)

FOREIGN PATENT DOCUMENTS

CN    102158919 A    8/2011
CN    102273312 A    12/2011
(Continued)

OTHER PUBLICATIONS

International Search Report (ISR) dated Jun. 27, 2018, 2018 for Application No. PCT/CN2018/076552.
(Continued)

*Primary Examiner* — Marcos L Torres
(74) *Attorney, Agent, or Firm* — Ladas & Parry LLP

(57) ABSTRACT

A core network device receives a fallback identifier from an access network device in a first radio access network when radio access technology (RAT) of a terminal is falling back from RAT of the first radio access network to RAT of a second radio access network. The first radio access network is a 5G network, and the second radio access network is a 4G network. The core network device determines, according to the fallback identifier, that the fallback of the RAT of the terminal from the RAT of the first radio access network to the RAT of the second radio access network is for establishing a voice service under the second radio access network. After the RAT of the terminal falls back from the RAT of the first radio access network to the RAT of the second
(Continued)

radio access network, the core network device establishes a bearer/flow for the voice service.

18 Claims, 11 Drawing Sheets

(51) Int. Cl.
  *H04W 8/08* (2009.01)
  *H04W 36/32* (2009.01)
  *H04W 48/16* (2009.01)
  *H04W 80/10* (2009.01)
  *H04W 84/04* (2009.01)
(52) U.S. Cl.
  CPC ............ *H04W 48/16* (2013.01); *H04W 76/11* (2018.02); *H04W 80/10* (2013.01); *H04W 84/042* (2013.01)
(58) Field of Classification Search
  CPC ... H04W 84/042; H04W 36/00; H04W 36/14; H04W 36/0077; H04W 36/16
  See application file for complete search history.

(56) References Cited

U.S. PATENT DOCUMENTS

| | | | | |
|---|---|---|---|---|
| 2019/0098547 | A1* | 3/2019 | Chong | H04W 76/12 |
| 2020/0015128 | A1* | 1/2020 | Stojanovski | H04W 36/0022 |
| 2020/0112892 | A1* | 4/2020 | Shi | H04W 48/16 |

FOREIGN PATENT DOCUMENTS

| | | |
|---|---|---|
| CN | 103313426 A | 9/2013 |
| CN | 102158919 B | 10/2013 |
| CN | 103747462 A | 4/2014 |
| CN | 105050147 A | 11/2015 |
| CN | 105338584 A | 2/2016 |
| WO | 2011053849 A2 | 5/2011 |

OTHER PUBLICATIONS

International Search Report (ISR) dated Jun. 28, 2018 for Application No. PCT/CN2017/106598.
International Search Report (ISR) dated Jun. 28, 2018 for Application No. PCT/CN2017/105768.
The EESR of corresponding European application No. 18866670.5 , dated Nov. 10, 2020.
Qualcomm Incorporated:"TS 23.501: Idle camping priority for voice and fallback to E-UTRA", 3GPP Draft; S2-174459-TS23501-Voice Fallback-R2, 3rd Generation Partnership Project (3GPP), Mobile Competence Centre; 650, Route Des Lucioles; F-06921 Sophia-Antipolis Cedex; France, vol. SA WG2, No. San Jose Del Cabo, Mexico; Jun. 26, 2017-Jun. 30, 2017 Jun. 25, 2017(Jun. 25, 2017), XP051303307.
Huawei et al. "Voice service for the UE camping on 5GS" 3GPP SA WG2 Meeting #122 Bis S2-175551, Aug. 25, 2017. p. 2.
Huawei et al. "How to return to LTE for CSFB" 3GPP SA WG2 Meeting #95 S2-130360, Feb. 1, 2013, section 2.
3GPP."Procedures for the 5G System" 3GPP TS 23.502 V1.2.0, Sep. 30, 2017, pp. 91-92.
Summons to attend oral proceedings of corresponding European application No. 18866670.5, dated Feb. 14, 2022, 12 pages.
Qualcomm Incorporated:"Idle camping priority for voice and fallback to E-UTRA procedures", 3GPP Draft; S2-174460-TS23502-Voice Fallback-R2, 3rd Generation Partnership Project (3GPP), Mobile Competence Centre; 650, Route Des Lucioles; F-06921 Sophia-Antipolis Cedex; France, vol. RAN WG1, No. San Jose Del Cabo, Mexico; Jun. 26, 2017-Jun. 30, 2017 Jun. 25, 2017, XP051303308, 9 pages.
The first Office Action of corresponding Singaporean application No. 11202003293Q, dated Nov. 29, 2021.
The first Office Action of corresponding Japanese application No. 2020-520571, dated Dec. 14, 2021.
The first Office Action of corresponding Korean application No. 10-2020-7011098, dated Dec. 21, 2021.
The first Office Action of corresponding Chinese application No. 201880038848.X, dated May 18, 2021.
The first Office Action of corresponding European application No. 18866670.5, dated Jun. 2, 2021.
The first Office Action of corresponding Indian application No. 202017019836, dated Jul. 1, 2021.
ZTE, Discussion on EPS/RAT fallback scenario and solution, 3GPP TSG SA WG2 #122BIS S2-17' 77, 3GPP, Aug. 21-25, 2017.
ZTE, 23.502 P-CR on EPS/RAT fallback, 3GPP TSG SA WG2 #122BIS S2-175479, 3GPP; Aug. 21-25, 2017.
Huawei, CATR, China Mobile, Voice service procedure for the UE camping on 5GS, 3GPP TSG SA WG2 #122BIS S2-175552, 3GPP, Aug. 21-25, 2017.
China Unicorn, Procedure of Voice fallback in 23.502 3GPP TSG SA WG2#122BIS S2-175487, 3GPP, Jul. 21-25, 2017.
Intel, Samsung EPS fallback, 3GPP TSG SA WG2 #122 S2-174552, 3GPP, Jun. 26-30, 2017.
Huawei, Conflict handling between handover procedure and QoS flow procedure in 5GC aligning with EPC, 3GPP TSG SA WG2 #122BIS S2-175550, 3GPP, Aug. 21-25, 2017.
China Unicorn, Support of EPS fallback—23.501, 3GPP TSG SA WG2 #122BIS S2-175486, 3GPP, Aug. 21-25, 2017.
The brief communication of corresponding European application No. 18866670.5 dated Sep. 13, 2022.

* cited by examiner

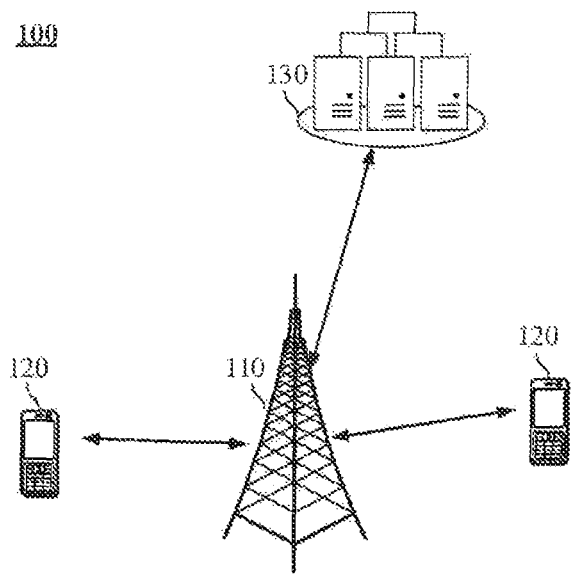

In a process of handing over an RAT of a terminal device from a first radio access network to a second radio access network, a first device obtains a device identity of a target access network device under the second radio access network that the terminal device is to access, where the first radio access network and the second radio access network are under different communication protocol versions, and there is an overlapped area between a coverage area of the first radio access network and a coverage area of the second radio access network ~ 210

If the device identity of the target access network device exists in a first set, the first device determines that the RAT of the terminal device is being handed over from the first radio access network to the second radio access network for a purpose of performing a voice service, where the first set includes all access network device identities under the second radio access network in the overlapped area ~ 220

FIG. 2

800 — After an RAT of a terminal device is handed over from a first radio access network to a second radio access network and the terminal device completes a voice service under the second radio access network, the access network device receives indicating information for deleting a voice service bearer from a first device, where the indicating information indicates to the access network device that a current bearer is used for the voice service, and the first radio access network and the second radio access network are under different communication protocol versions — 810

After the current bearer is deleted according to the indicating information, the access network device triggers the RAT of the terminal device to return from the second radio access network to the first radio access network — 820

Start

A first device obtains a fallback identifier in a process of handing over an RAT of a terminal device from a first radio access network to a second radio access network, where the fallback identifier is used for indicating a purpose of handing over the RAT of the terminal device from the first radio access network to the second radio access network, and the first radio access network and the second radio access network are under different communication protocol versions — 910

End

FIG. 10

METHOD FOR NETWORK HANDOVER AND RETURNING AFTER NETWORK HANDOVER, ACCESS NETWORK DEVICE AND CORE NETWORK DEVICE

CROSS-REFERENCE TO RELATED APPLICATIONS

The present application is a continuation of International Application No. PCT/CN2018/076552, filed on Feb. 12, 2018, which claims priority to International Application No. PCT/CN2017/105768, filed on Oct. 11, 2017, and international Application No. PCT/CN2017/106598, filed on Oct. 17, 2017. The contents of all of the aforementioned applications are hereby incorporated by reference in their entireties.

TECHNICAL FIELD

The present disclosure relates to the field of communications and, more particularly, to a method for returning after a network handover, an access network device and a core network device.

BACKGROUND

At the onset of 5G new radio (NR) network deployment, a fallback from 5G NR network to 4G long term evolution (LTE) network may occur in some scenarios (e.g., in network congestion, or the need for a voice service, etc.). However, for now, after the fallback from the 5G NR network to the 4G LTE network, it is impossible to accurately determine whether the fallback is for the voice service, nor is there any specification regarding how to return to the 5G NR network. Thus, after the occurrence of fallback from the 5G NR network to the 4G LTE network, it is impossible to accurately determine whether the fallback is for the voice service, nor is a swift return to the 5G NR network possible, spoiling the user experience.

SUMMARY

Embodiments of the present disclosure provide a method for determining a voice fallback, a method for returning after a network handover, a method for indicating a purpose of a network handover, a method and a device for determining a voice service, an access network device and a core network device. Accordingly, after falling from a 5G NR network; back to a 4G LTE network, a radio access technology (RAT) of a terminal device can quickly return to the 5G NR network, thereby ensuring maximum use of the 5G NR network by a user, thus enhancing the user experience.

In a first aspect, embodiments of the present disclosure provide a method for determining a voice fallback, including:

in a process of handing over a radio access technology RAT of a terminal device from a first radio access network to a second radio access network, obtaining, by a first device, a device identity of a target access network device under the second radio access network that the terminal device is to access, where the first radio access network and the second radio access network are under different communication protocol versions, and there is an overlapped area between a coverage area of the first radio access network and a coverage area of the second radio access network; and if the device identity of the target access network device exists in a first set, determining, by the first device, that the RAT of the terminal device is being handed over from the first radio access network to the second radio access network for a purpose of performing a voice service, where the first set includes all access network device identities under the second radio access network in the overlapped area.

In an embodiment, the first radio access network is better than the second radio access network, and a user can have a better experience under the first radio access network.

Therefore, in the method for determining a voice fallback in the embodiments of the present disclosure, in the process of handing over the RAT of the terminal device from the first radio access network to the second radio access network, if the device identity of the target access network device under the second radio access network which the terminal device is to access exists in the first set, the first device determines that the RAT of the terminal device is being handed over from the first radio access network to the second radio access network for the purpose of performing the voice service. Thus, when the terminal device undergoes a network handover, an accurate determination can be made on whether the handover is intended for a voice service. Further, after the handover, the voice service can be quickly performed, reducing the signaling overhead incurred from determining the voice service.

In an implementation of the first aspect, the method further includes:

determining, by the first device, that a flow/bearer with an ongoing voice service needs to be handed over to the second radio access network, where if the device identity of the target access network device exists in a first set, determining, by the first device, that the RAT of the terminal device is being handed over from the first radio access network to the second radio access network for a purpose of performing a voice service includes:

if the device identity of the target access network device exists in the first set and the first device determines that the flow/bearer with the ongoing voice service needs to be handed over to the second radio access network, determining, by the first device, that the RAT of the terminal device is being handed over from the first radio access network to the second radio access network for the purpose of performing the voice service.

Therefore, in the method for determining a voice fallback in the embodiments of the present disclosure, if the device identity of the target access network device exists in the first set and the first device determines that the flow/bearer with the ongoing voice service needs to be handed over to the second radio access network, the first device determines that the RAT of the terminal device is being handed over from the first radio access network to the second radio access network for the purpose of performing the voice service.

In an implementation of the first aspect, the first set is pre-configured.

In an implementation of the first aspect, the first radio access network is a new radio NR network, the second radio access network is a long term evolution LTE network, and the first device is an access and mobility management function (AMF) device.

In an implementation of the first aspect, the method further includes:

sending, by the AMF device, indicating information to a second device, where the indicating information includes a voice identifier and/or a pre-handover public land mobile network (PLMN) identifier, and the indicating information is used for indicating to the second device that the RAT of the terminal device is being handed over from the NR network to the LTE network for the purpose of performing the voice service.

In an implementation of the first aspect, the RAT of the terminal device is handed over from the NR network to the LTE network in a first handover mode, where in the first handover mode, a core network 5GC for the NR network remains unchanged, and the 5GC serving the NR network simultaneously serves the LTE network; and the sending, by the AMF device, indicating information to a second device includes:

sending, by the AMF device, the indicating information to a session management function (SMF) device.

In an implementation of the first aspect, the RAT of the terminal device is handed over from the NR network to the LTE network in a second handover mode, where in the second handover mode, a 5GC for the NR network remains unchanged, an AMF of the 5GC is switched from a source AMF to a target AMF, and the 5GC serving the NR network simultaneously serves the LTE network; and the sending, by the AMF device, indicating information to a second device includes:

sending, by the source AMF device, the indicating information to the target AMF device.

In an implementation of the first aspect, the RAT of the terminal device is handed over from the NR network to the LTE network in a third handover mode, where a 5GC for the NR network is switched to an evolved packet core EPC for the LTE network in the third handover mode; and the sending, by the AMF device, indicating information to a second device includes:

sending, by the AMF device, the indicating information to a mobile management entity MME device.

In a second aspect, embodiments of the present disclosure provide a method for returning after a network handover, including:

after a radio access technology RAT of a terminal device is handed over from a first radio access network to a second radio access network, sending, by a first device, indicating information for deleting a current bearer/flow to an access network device, where the indicating information includes a pre-handover public land mobile network PLMN identifier and/or a pre-handover access network device identity, the first radio access network and the second radio access network are under different communication protocol versions, and there is an overlapped area between a coverage area of the first radio access network and a coverage area of the second radio access network.

In an embodiment, the first radio access network is better than the second radio access network, and a user can have a better experience under the first radio access network.

Therefore, in the method for returning after a network handover in the embodiments of the present disclosure, after the RAT of the terminal device is handed over from the first radio access network to the second radio access network, the first device sends the indicating information for deleting the current bearer/flow to the access network device, and the indicating information includes the pre-handover PLMN identifier and/or the pre-handover access network device identity, according to which the access network device can thus determine to trigger the RAT of the terminal device to return from the second radio access network to the first radio access network, thus enabling the terminal device to experience the first radio access network to the greatest extent while improving the user experience.

In an implementation of the second aspect, the current bearer/flow is a bearer/flow for performing a voice service.

In an implementation of the second aspect, the first radio access network is a new radio NR network, the second radio access network is a long term evolution LTE network, the first device is an access and mobility management function AMF device or a mobile management entity MME device, and the access network device is a base station gNB for the NR network.

In an implementation of the second aspect, the method further includes:

obtaining, by the first device, the pre-handover PLMN identifier and/or the pre-handover access network device identity.

In an implementation of the second aspect, if the first device is the AMF device and the RAT of the terminal device is handed over from the NR network to the LTE network in a first handover mode, where in the first handover mode, a core network 5GC for the NR network remains unchanged, and the 5GC serving the NR network simultaneously serves the LTE network, the obtaining, by the first device, the pre-handover PLMN identifier and/or the pre-handover access network device identity includes:

obtaining, by the AMF device, the pre-handover PLMN identifier and/or the pre-handover access network device identity from a pre-handover access network device.

In an implementation of the second aspect, if the first device is the AMF device and the RAT of the terminal device is handed over from the NR network to the LTE network in a second handover mode, where in the second handover mode, a 5GC for the NR network remains unchanged, an AMF of the 5GC is switched from a source AMF to a target AMF, and the 5GC serving the NR network simultaneously serves the LTE network, the obtaining, by the first device, the pre-handover PLMN identifier and/or the pre-handover access network device identity includes:

obtaining, by the target AMF device, the pre-handover PLMN identifier and/or the pre-handover access network device identity from the source AMP device.

In an implementation of the second aspect, if the first device is the MME device and the RAT of the terminal device is handed over from the NR network to the LTE network in a third handover mode, where a 5GC for the NR network is switched to an evolved packet core EPC for the LTE network in the third handover mode, the obtaining, by the first device, the pre-handover PLMN identifier and/or the pre-handover access network device identity includes:

obtaining, by the MME device, the pre-handover PLMN identifier and/or the pre-handover access network device identity from an AMP device.

In a third aspect, embodiments of the present disclosure provide a method for returning after a network handover, including:

after a radio access technology RAT of a terminal device is handed over from a first radio access network to a second radio access network, receiving, by an access network device, indicating information for deleting a current bearer/flow from a first device, where the indicating information includes a pre-handover public land mobile network PLMN identifier and/or a pre-handover access network device identity, the first radio access network and the second radio access network are under different communication protocol versions, and there is an overlapped area between a coverage area of the first radio access network and a coverage area of the second radio access network; and after the current bearer is deleted according to the indicating information, determining, by the access network device and according to the pre-handover PLMN identifier and/or the pre-handover access network device identity, to trigger the RAT of the terminal device to return from the second radio access network to the first radio access network.

Therefore, in the method for returning after a network handover in the embodiments of the present disclosure, after the RAT of the terminal device is handed over from the first radio access network to the second radio access network, the first device sends the indicating information for deleting the current bearer/flow to the access network device, and the indicating information includes the PLMN identifier before the handover and/or the access network device identity before the handover, according to which the access network device can thus determine to trigger the RAT of the terminal device to return from the second radio access network to the first radio access network, thus enabling the terminal device to experience the first radio access network to the greatest extent while improving the user experience.

In an implementation of the third aspect, the current bearer/flow is a bearer/flow for performing a voice service.

In an implementation of the third aspect, the first radio access network is a new radio NR network, the second radio access network is a long term evolution LTE network, the access network device is a base station gNB for the NR network, and the first device is an access and mobility management function AMF device or a mobile management entity MME device.

In a fourth aspect, embodiments of the present disclosure provide a method for returning after a network handover, including:

after a radio access technology RAT of a terminal device is handed over from a first radio access network to a second radio access network, sending, by a first device, a handover indication to an access network device, where the handover indication is used for indicating the access network device to trigger the RAT of the terminal device to return from the second radio access network to the first radio access network, and the first radio access network and the second radio access network are under different communication protocol versions.

In an embodiment, the first radio access network is better than the second radio access network, and a user can have a better experience under the first radio access network.

Therefore, in the method for returning after a network handover in the embodiments of the present disclosure, after the RAT of the terminal device is handed over from the first radio access network to the second radio access network, the first device sends the handover indication to the access network device, so that the access network device returns from the second radio access network to the first radio access network, thus enabling the terminal device to utilize the first radio access network to the greatest extent while improving the user experience.

In an implementation of the fourth aspect, when the terminal device needs to perform a voice service, the RAT of the terminal device is handed over from the first radio access network to the second radio access network.

In an implementation of the fourth aspect, after the RAT of the terminal device is handed over from the first radio access network to the second radio access network and before the first device sends the handover indication to the access network device, the method further includes:

triggering, by the first device, the access network device to establish for the terminal device a first bearer/flow which is used for performing a voice service under the second radio access network.

In an implementation of the fourth aspect, the first radio access network is a new radio NR network, the second radio access network is a long term evolution LTE network, the first device is an access and mobility management function AMF device or a session management function SMF device or a session management function+core packet gateway SMF+PGW-C device, and the access network device is an evolved universal terrestrial radio access network E-UTRAN device; and the sending, by a first device, a handover indication to an access network device includes:

sending, by the AMF device or the SMF device or the SMF+PGW-C device, the handover indication to the E-UTRAN device.

In a fifth aspect, embodiments of the present disclosure provide a method for returning after a network handover, including:

after a radio access technology RAT of a terminal device is handed over from a first radio access network to a second radio access network, receiving, by an access network device, a handover indication from a first device, where the handover indication is used for indicating the access network device to trigger the RAT of the terminal device to return from the second radio access network to the first radio access network, and the first radio access network and the second radio access network are under different communication protocol versions; and triggering, by the access network device and according to the handover indication, the RAT of the terminal device to return from the second radio access network to the first radio access network.

In an embodiment, the first radio access network is better than the second radio access network, and a user can have a better experience under the first radio access network.

Therefore, in the method for returning after a network handover in the embodiments of the present disclosure, after the RAT of the terminal device is handed over from the first radio access network to the second radio access network, the first device sends the handover indication to the access network device, so that the access network device returns from the second radio access network to the first radio access network, thus enabling the terminal device to utilize the first radio access network to the greatest extent while improving the user experience.

In an implementation of the fifth aspect, when the terminal device needs to perform a voice service, the RAT of the terminal device is handed over from the first radio access network to the second radio access network.

In an implementation of the fifth aspect, the first radio access network is a new radio NR network, the second radio access network is a long term evolution LTE network, the first device is an access and mobility management function AMF device or a session management function SMF device, and the access network device is an evolved universal terrestrial radio access network E-UTRAN device; and the receiving, by an access network device, a handover indication from a first device includes:

receiving, by the E-UTRAN device, the handover indication from the AMF device or the SMF device.

In an implementation of the fifth aspect, the triggering, by the access network device and according to the handover indication, the RAT of the terminal device to return from the second radio access network to the first radio access network includes:

triggering, by the access network device in a first handover mode and according to the handover indication, the RAT of the terminal device to return from the second radio access network to the first radio access network, where a core network 5GC for the NR network remains unchanged in the first handover mode.

In an implementation of the fifth aspect, the first radio access network is an NR network, the second radio access network is an LTE network, the first device is a session management function+core packet gateway SMF+PGW-C device, and the access network device is an E-UTRAN device; and the receiving, by an access network device, a handover indication from a first device includes:

receiving, by the E-UTRAN device, the handover indication from the SMF+PGW-C device.

In an implementation of the fifth aspect, the triggering, by the access network device and according to the handover indication, the RAT of the terminal device to return from the second radio access network to the first radio access network includes:

triggering, by the access network device in a second handover mode and according to the handover indication, the RAT of the terminal device to return from the second radio access network to the first radio access network, where an evolved packet core EPC for the LTE network is switched back to the 5GC for the NR network in the second handover mode.

In a sixth aspect, embodiments of the present disclosure provide a method for returning after a network handover, including:

after a radio access technology RAT of a terminal device is handed over from a first radio access network to a second radio access network and the terminal device completes a voice service under the second radio access network, sending, by a first device, indicating information for deleting a voice service bearer to an access network device, where the indicating information indicates to the access network device that a current bearer is used for the voice service, and the first radio access network and the second radio access network are under different communication protocol versions.

Therefore, in the method for returning after a network handover in the embodiments of the present disclosure, after the RAT of the terminal device is handed over from the first radio access network to the second radio access network and the terminal device completes the voice service under the second radio access network, the first device sends the indicating information for deleting the voice service bearer to the access network device, so that after the access network device deletes the current bearer according to the indicating information, the access network device determines to trigger the RAT of the terminal device to return from the second radio access network to the first radio access network, thus enabling the terminal device to experience the first radio access network to the greatest extent while improving the user experience.

In an implementation of the sixth aspect, the first radio access network is a new radio NR network, the second radio access network is a long term evolution LTE network, the first device is an access and mobility management function AMF device or a session management function SMF device or a session management function+core packet gateway SMF+PGW-C device, and the access network device is an evolved universal terrestrial radio access network E-UTRAN device; and the sending, by the first device, indicating information to an access network device includes:

sending, by the AMF device or the SMF device or the SMF+PGW-C device, the indicating information to the E-UTRAN device.

In a seventh aspect, embodiments of the present disclosure provide a method for returning after a network handover, including:

after a radio access technology RAT of a terminal device is handed over from a first radio access network to a second radio access network and the terminal device completes a voice service under the second radio access network, receiving, by an access network device, indicating information for deleting a voice service bearer from a first device, where the indicating information indicates to the access network device that a current bearer is used for the voice service, and the first radio access network and the second radio access network are under different communication protocol versions; and after the current bearer is deleted according to the indicating information, triggering, by the access network device, the RAT of the terminal device to return from the second radio access network to the first radio access network.

Therefore, in the method for returning after a network handover in the embodiments of the present disclosure, after the RAT of the terminal device is handed over from the first radio access network to the second radio access network and the terminal device completes the voice service under the second radio access network, the first device sends the indicating information for deleting the voice service bearer to the access network device, so that after the access network device deletes the current bearer according to the indicating information, the access network device determines to trigger the RAT of the terminal device to return from the second radio access network to the first radio access network, thus enabling the terminal device to experience the first radio access network to the greatest extent while improving the user experience.

In an implementation of the seventh aspect, the first radio access network is a new radio NR network, the second radio access network is a long term evolution LTE network, the first device is an access and mobility management function AMF device or a session management function SMF device or a session management function+core packet gateway SMF+PGW-C device, and the access network device is an evolved universal terrestrial radio access network E-UTRAN device; and the receiving, by an access network device, indicating information for deleting a voice service bearer from a first device includes:

receiving, by the E-UTRAN device, the indicating information from the AMF device or the SMF device or the SMF+PGW-C device.

In an implementation of the seventh aspect, if the access network device is currently connected to a core network 5GC for the NR network, the triggering, by the access network device, the RAT of the terminal device to return from the second radio access network to the first radio access network includes:

triggering, by the access network device in a first handover mode, the RAT of the terminal device to return from the second radio access network to the first radio access network, where a core network 5GC for the NR network remains unchanged in the first handover mode.

In an implementation of the seventh aspect, if the access network device is currently connected to an evolved packet core EPC for the LTE network, the triggering, by the access network device, the RAT of the terminal device to return from the second radio access network to the first radio access network includes:

triggering, by the access network device in a second handover mode, the RAT of the terminal device to be handed over from the second radio access network back to the first radio access network, where the EPC for the LTE network is switched back to the 5GC for the NR network in the second handover mode.

In an eighth aspect, embodiments of the present disclosure provide a method for indicating a purpose of a network handover, including:

obtaining, by a first device, a fallback identifier in a process of handing over a radio access technology RAT of a terminal device from a first radio access network to a second radio access network, where the fallback identifier is used for indicating a purpose of handing over the RAT of the terminal device from the first radio access network to the second radio access network, and the first radio access network and the second radio access network are under different communication protocol versions.

Therefore, in the method for indicating a purpose of a network handover in the embodiments of the present disclosure, in the process of handing over the RAT of the terminal device from the first radio access network to the second radio access network, the first device obtains the fallback identifier which indicates the purpose of the network handover, thus the purpose of the network fallback can be determined, and then an accurate response can be given.

In an implementation of the eighth aspect, the first device triggers, according to the fallback identifier, the RAT of the terminal device to return from the second radio access network to the first radio access network.

In an embodiment, the first radio access network is better than the second radio access network, and a user can have a better experience under the first radio access network.

Therefore, in the method for indicating a purpose of a network handover in the embodiments of the present disclosure, the first device triggers, according to the fallback identifier obtained in the process of handing over the RAT of the terminal device from the first radio access network to the second radio access network, a return from the second radio access network to the first radio access network, thus ensuring maximum use of the first radio access network by the terminal device while improving the user experience.

In an implementation of the eighth aspect, the fallback identifier indicates that the purpose of handing over the RAT of the terminal device from the first radio access network to the second radio access network is to establish for the terminal device a voice service under the second radio access network.

In an implementation of the eighth aspect, the obtaining, by a first device, a fallback identifier in a process of handing over an RAT of a terminal device from a first radio access network to a second radio access network includes:

obtaining, by the first device, the fallback identifier in the process of handing over the RAT of the terminal device from the first radio access network to the second radio access network in a first handover mode, where in the first handover mode, a core network for the first radio access network remains unchanged, an internal network element of the core network remains unchanged, and the core network serving the first radio access network simultaneously serves the second radio access network.

In an implementation of the eighth aspect, the first radio access network is a new radio NR network, the second radio access network is a long term evolution LTE network, and in the first handover mode, a core network 5GC for the NR network remains unchanged, an access and mobility management function AMF of the 5GC remains unchanged, and the 5GC serving the NR network simultaneously serves the LTE network.

In an implementation of the eighth aspect, the first device is an AMF device, and the obtaining, by a first device, a fallback identifier includes:

receiving, by the AMF device, the fallback identifier from an access network device.

In an implementation of the eighth aspect, after receiving, by the AMF device, the fallback identifier from an access network device, the method further includes:

sending, by the AMF device, the fallback identifier to a session management function SMF.

In an implementation of the eighth aspect, the first device is a target access network device, and the obtaining, by a first device, a fallback identifier includes:

receiving, by the target access network device, the fallback identifier from a source access network device.

In an implementation of the eighth aspect, the obtaining, by a first device, a fallback identifier in a process of handing over an RAT of a terminal device from a first radio access network to a second radio access network includes:

obtaining, by the first device, the fallback identifier in a process of handing over the RAT of the terminal device from the first radio access network to the second radio access network in a second handover mode, where in the second handover mode, a core network for the first radio access network remains unchanged, an internal network element of the core network changes, and the core network serving the first radio access network simultaneously serves the second radio access network.

In an implementation of the eighth aspect, the first radio access network is an NR network, the second radio access network is an LTE network, and in the second handover mode, a 5GC for the NR network remains unchanged, an AMF of the 5GC is switched from a source AMF to a target AMF, and the 5GC serving the NR network simultaneously serves the LTE network.

In an implementation of the eighth aspect, the first device is an SMF device, and the obtaining, by a first device, a fallback identifier includes:

receiving, by the SMF device, the fallback identifier from an access network device.

In an implementation of the eighth aspect, the receiving, by the SMF device, the fallback identifier from an access network device includes:

receiving, by the SMF device, the fallback identifier forwarded by the target AMF device from the source AMF device, where the fallback identifier is obtained by the source AMF device from the access network device.

In an implementation of the eighth aspect, the obtaining, by a first device, a fallback identifier in a process of handing over an RAT of a terminal device from a first radio access network to a second radio access network includes:

obtaining, by the first device, the fallback identifier in a process of handing over the RAT of the terminal device from the first radio access network to the second radio access network in a third handover mode, where a core network for the first radio access network is switched to a core network for the second radio access network in the third handover mode.

In an implementation of the eighth aspect, the first radio access network is an NR network, the second radio access network is an LTE network, and a 5GC for the NR network is switched to an evolved packet core EPC for the LTE network in the third handover mode.

In an implementation of the eighth aspect, the first device is a session management function+core packet gateway SMF+PGW-C device, and the obtaining, by a first device, a fallback identifier includes:

receiving, by the SMF+PGW-C device, the fallback identifier from an access network device.

In an implementation of the eighth aspect, the receiving, by the SMF+PGW-C device, the fallback identifier from an access network device includes:

receiving, by the SMF+PGW-C device, the fallback identifier forwarded by an AMF device from the access network device.

In a ninth aspect, embodiments of the present disclosure provide a method for determining a voice service, including:

obtaining first information which is used for indicating that a first bearer/flow for a terminal device is not successfully established, where the first bearer/flow is used for performing a voice service under a first radio access network;

establishing a second bearer/flow for the terminal device after a radio access technology RAT of the terminal device is handed over from the first radio access network to a second radio access network, where the first radio access network and the second radio access network are under different communication protocol versions;

determining that the second bearer/flow is used for performing a voice service under the second radio access network.

Therefore, in the method for determining a voice service in the embodiments of the present disclosure, after receiving the first information which is used for indicating that the first bearer/flow for the terminal device is not successfully established and after handing over the RAT of the terminal device from the first radio access network to the second radio access network, it is determined that the second bearer/flow is used for performing the voice service under the second radio access network, thus enabling an accurate determination regarding whether the established bearer/flow is a bearer/flow for performing the voice service.

In an implementation of the ninth aspect, the method further includes:

after the second bearer/flow is released, triggering the RAT of the terminal device to return from the second radio access network to the first radio access network.

In an implementation of the ninth aspect, a purpose of handing over the RAT of the terminal device from the first radio access network to the second radio access network is to establish the second bearer/flow.

In an implementation of the ninth aspect, the RAT of the terminal device is handed over from the first radio access network to the second radio access network in a first handover mode, where in the first handover mode, a core network for the first radio access network remains unchanged, an internal network element of the core network remains unchanged, and the core network serving the first radio access network simultaneously serves the second radio access network.

In an implementation of the ninth aspect, the first radio access network is a new radio NR network, the second radio access network is a long term evolution LTE network, and in the first handover mode, a core network 5GC for the NR network remains unchanged, an access and mobility management function AMF of the 5GC remains unchanged, and the 5GC serving the NR network simultaneously serves the LTE network.

In an implementation of the ninth aspect, the RAT of the terminal device is handed over from the first radio access network to the second radio access network in a second handover mode, where in the second handover mode, a core network for the first radio access network remains unchanged, an internal network element of the core network changes, and the core network serving the first radio access network simultaneously serves the second radio access network.

In an implementation of the ninth aspect, the first radio access network is an NR network, the second radio access network is an LTE network, and in the second handover mode, a core network 5GC for the NR network remains unchanged, an AMF of the 5GC is switched from a source AMF to a target AMF, and the 5GC serving the NR network simultaneously serves the LTE network.

In an implementation of the ninth aspect, the first bearer/flow is a flow with a quality of service identifier 5QI=1, and the second bearer/flow is a flow with 5QI=1.

In an implementation of the ninth aspect, the RAT of the terminal device is handed over from the first radio access network to the second radio access network in a third handover mode, where a core network for the first radio access network is switched to a core network for the second radio access network in the third handover mode.

In an implementation of the ninth aspect, the first radio access network is an NR network, the second radio access network is an LTE network, and a 5GC for the NR network is switched to an evolved packet core EPC for the LTE network in the third handover mode.

In an implementation of the ninth aspect, the first bearer/flow is a flow with a quality of service identifier 5QI=1, and the second bearer/flow is a bearer with a quality of service class identifier QCI=1.

In a tenth aspect, embodiments of the present disclosure provide a core network device, including a module or a unit capable of implementing the method according to the first aspect or any one of the optional implementations thereof.

In an eleventh aspect, embodiments of the present disclosure provide a core network device, including a module or a unit capable of implementing the method according to the second aspect or any one of the optional implementations thereof.

In a twelfth aspect, embodiments of the present disclosure provide an access network device, including a module or a unit capable of implementing the method according to the third aspect or any one of the optional implementations thereof.

In a thirteenth aspect, embodiments of the present disclosure provide a core network device, including a module or a unit capable of implementing the method according to the fourth aspect or any one of the optional implementations thereof.

In a fourteenth aspect, embodiments of the present disclosure provide an access network device, including a module or a unit capable of implementing the method according to the fifth aspect or any one of the optional implementations thereof.

In a fifteenth aspect, embodiments of the present disclosure provide a core network device, including a module or a unit capable of implementing the method according to the sixth aspect or any one of the optional implementations thereof.

In a sixteenth aspect, embodiments of the present disclosure provide an access network device, including a module or a unit capable of implementing the method according to the seventh aspect or any one of the optional implementations thereof.

In a seventeenth aspect, embodiments of the present disclosure provide a core network device, including a module or a unit capable of implementing the method according to the eighth aspect or any one of the optional implementations thereof.

In an eighteenth aspect, embodiments of the present disclosure provide a device for determining a voice service, including a module or a unit capable of implementing the method according to the ninth aspect or any one of the optional implementations thereof.

In a nineteenth aspect, a core network device is provided, which includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the execution enables the processor to implement the method according to the first aspect or any possible implementation thereof.

In a twentieth aspect, a core network device is provided, which includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the execution enables the processor to implement the method according to the second aspect or any possible implementation thereof.

In a twenty-first aspect, an access network device is provided, which includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the execution enables the processor to implement the method according to the third aspect or any possible implementation thereof.

In a twenty-second aspect, a core network device is provided, which includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the execution enables the processor to implement the method according to the fourth aspect or any possible implementation thereof.

In a twenty-third aspect, an access network device is provided, which includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the execution enables the processor to implement the method according to the fifth aspect or any possible implementation thereof.

In a twenty-fourth aspect, a core network device is provided, which includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the execution enables the processor to implement the method according to the sixth aspect or any possible implementation thereof.

In a twenty-fifth aspect, an access network device is provided, which includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the execution enables the processor to implement the method according to the seventh aspect or any possible implementation thereof.

In a twenty-sixth aspect, a core network device is provided, which includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the execution enables the processor to implement the method according to the eighth aspect or any possible implementation thereof.

In a twenty-seventh aspect, a device for determining a voice service is provided, which includes a processor, a memory, and a communication interface. The processor is connected to the memory and the communication interface. The memory is configured to store instructions, the processor is configured to execute the instructions, and the communication interface is configured to communicate with other network elements under the control of the processor. When the processor executes the instructions stored in the memory, the execution enables the processor to implement the method according to the ninth aspect or any possible implementation thereof.

In a twenty-eighth aspect, a computer storage medium is provided, which stores thereon program codes that are used for instructing a computer to execute instructions of the method according to the first aspect or any one of the possible implementations thereof.

In a twenty-ninth aspect, a computer storage medium is provided, which stores thereon program codes that are used for instructing a computer to execute instructions of the method according to the second aspect or any one of the possible implementations thereof.

In a thirtieth aspect, a computer storage medium is provided, which stores thereon program codes that are used for instructing a computer to execute instructions of the method according to the third aspect or any one of the possible implementations thereof.

In a thirty-first aspect, a computer storage medium is provided, which stores thereon program codes that are used for instructing a computer to execute instructions of the method according to the fourth aspect or any one of the possible implementations thereof.

In a thirty-second aspect, a computer storage medium is provided, which stores thereon program codes that are used for instructing a computer to execute instructions of the method according to the fifth aspect or any one of the possible implementations thereof.

In a thirty-third aspect, a computer storage medium is provided, which stores thereon program codes that are used for instructing a computer to execute instructions of the method according to the sixth aspect or any one of the possible implementations thereof.

In a thirty-fourth aspect, a computer storage medium is provided, which stores thereon program codes that are used for instructing a computer to execute instructions of the method according to the seventh aspect or any one of the possible implementations thereof.

In a thirty-fifth aspect, a computer storage medium is provided, which stores thereon program codes that are used for instructing a computer to execute instructions of the method according to the eighth aspect or any one of the possible implementations thereof.

In a thirty-sixth aspect, a computer storage medium is provided, which stores thereon program codes that are used for instructing a computer to execute instructions of the method according to the ninth aspect or any one of the possible implementations thereof.

In a thirty-seventh aspect, a computer program product including instructions is provided, which, when executed on a computer, enables the computer to implement the methods described according to the foregoing aspects.

BRIEF DESCRIPTION OF DRAWINGS

FIG. 1 illustrates a wireless communication system in which embodiments of the present disclosure is applied.

FIG. 2 is a schematic flowchart of a method for determining a voice fallback according to embodiments of the present disclosure.

FIG. 9 is a schematic flowchart of still another method for returning after a network handover according to embodiments of the present disclosure.

FIG. 10 is a schematic flowchart of a method for indicating a purpose of a network handover according to embodiments of the present disclosure.

DETAILED DESCRIPTION

Figure 3:
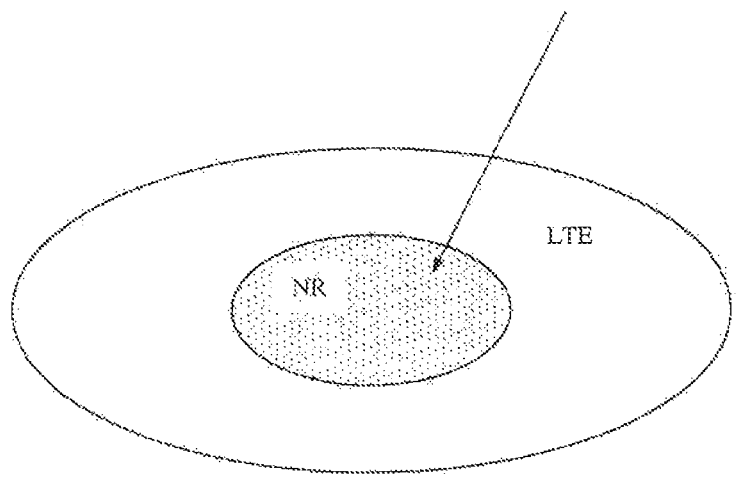
FIG. 3 is a schematic diagram of an overlapped area covered by a first radio access network and a second radio access network according to embodiments of the present disclosure.

Now the technical solutions in embodiments of the present disclosure will be described clearly and comprehensively hereunder with reference to accompanying drawings of the embodiments of the present disclosure.

The technical solutions in the embodiments of the present disclosure can be applied to a 5G NR communication system.

FIG. 1 illustrates a wireless communication system 100 in which embodiments of the present disclosure are applied. The wireless communication system 100 can include an access network device 110. The access network device 110 can be a device in communication with a terminal device. The access network device 110 can provide communication coverage for a specific geographical area, and can communicate with a terminal device (e.g., a UE) within the coverage area. In an embodiment, the access network device 110 may be a next generation radio access network (Next Generation Radio Access Network, NG RAN), or a base station (gNB) in an NR system, or a wireless controller in a cloud radio access network (Cloud Radio Access Network, CRAN). Or, the access network device may be a relay station, an access point, a vehicle-mounted device, a wearable device, or a network device in a future evolved public land mobile network (Public Land Mobile Network, PLMN), etc. In an embodiment, the access network device 110 may also be a base station in an LTE system, e.g., an evolved universal terrestrial radio access network (Evolved Universal Terrestrial Radio Access Network, E-UTRAN) device.

The wireless communication system 100 also includes at least one terminal device 120 located within the coverage of the access network device 110. The terminal device 120 may be mobile or stationary. In an embodiment, the terminal device 120 may refer to an access terminal, a user equipment (User Equipment, UE), a subscriber unit, a subscriber station, a mobile radio station, a mobile station, a remote station, a remote terminal, a mobile device, a user terminal, a terminal, a wireless communication device, a user agent or a user device. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handset or a computing device with wireless communication capability, or other processing devices connected to a wireless modem, a vehicle-mounted device, a wearable device, a terminal device in a further 5G network, or a terminal device in a future evolved PLMN, etc.

The wireless communication system 100 also includes a core network device 130 that communicates with the access network device. In an embodiment, the core network device 130 may be a 5G core network device, e.g., an access and mobility management function (Access and Mobility Management Function, AMF), a session management function (Session Management Function, SMF). In an embodiment, the core network device 130 may also be an evolved packet core (Evolved Packet Core, EPC) device of an LTE network, e.g., a session management function+core packet gateway (Session Management Function+Core Packet Gateway, SMF+PGW-C) device.

It should be understood that the SMF+PGW-C can simultaneously realize the functions that the SMF and the PGW-C can achieve.

In embodiments of the present disclosure, the AMF can exchange information with the SMF. For example, the SMF obtains from the AMF some information about the radio access network side.

In embodiments of the present disclosure, the AMF can obtain from the radio access network a fallback identifier, or a message for indicating that a first bearer/flow for a terminal device is not successfully established.

FIG. 1 illustratively shows one access network device, one core network device and two terminal devices. In an embodiment, the wireless communication system 100 may include more access network devices, and each access network device may cover other quantities of terminal devices, which is not limited in the embodiments of the present disclosure.

In an embodiment, the wireless communication system 100 may also include a mobile management entity (Mobile Management Entity MME), a unified data management (Unified Data Management, UDM), an authentication server function (Authentication Server Function, AUSF), a user plane function (User Plane Function, UPF), a signaling gateway (Signaling Gateway, SGW) and other network entities, which is not limited in the embodiments of the present disclosure.

It should be understood that, as used herein, the terms "system" and "network" may be used interchangeably. As used herein, the term "and/or" merely describes an association relation between related objects, representing three possible relations. For instance, "A and/or B" may represent three cases: A exists alone, A and B exist together, and B exists alone. Additionally, as used herein, the symbol "/" generally means the related objects before and after the symbol are in an "or" relation.

FIG. 2 is a schematic flowchart of a method 200 for determining a voice fallback according to embodiments of the present disclosure. As shown in FIG. 2, the access network device can be the access network device shown in FIG. 1, the terminal device can be the terminal device shown in FIG. 1, and the first device can be the core network device shown in FIG. 1. The method 200 includes the following.

At 210, in a process of handing over an RAT of a terminal device from a first radio access network to a second radio access network, a first device obtains a device identity of a target access network device under the second radio access network that the terminal device is to access, where the first radio access network and the second radio access network are under different communication protocol versions, and there is an overlapped area between a coverage area of the first radio access network and a coverage area of the second radio access network.

In an embodiment, the first radio access network can be an NR network, and the second radio access network can be an LTE network.

In an embodiment, as shown in FIG. 3, there is an overlapped area between the coverage area of the NR network and the coverage area of the LTE network.

It should be understood that, although the NR network in FIG. 3 has a smaller coverage area than that of the LTE network, this is for illustration only. Rather, the coverage area of the NR network may be greater than or equal to that of the LTE network, which is not limited in the embodiments of the present disclosure.

In an embodiment, if the terminal device is in the overlapped area and connected to an NR network, the terminal device can perform normal data services in the overlapped area, and when the terminal device needs to perform the voice service, the RAT of the terminal device is triggered to fall back (or be handed over) from the NR network to the LTE network.

In an embodiment, in a 5G NR network deployment, the network may not support the voice service. Hence, when the terminal device needs to perform the voice service, it needs to fall back (or be handed over) from the NR network to the LTE network.

In an embodiment, when the first radio access network is in a congested state, the RAT of the terminal device is handed over from the first radio access network to the second radio access network.

In an embodiment, the first device is an access and mobility management function (Access and Mobility Management Function, AMF) device.

In an embodiment, the device identity of the target access network device under the second radio access network that the terminal device is to access can be an evolved Node B identity, (Evolved Node B Identity, eNB ID).

In an embodiment, the RAT of the terminal device can be handed over from the first radio access network to the second radio access network in three handover modes as the following.

In a first handover mode, the RAT of the terminal device is handed over from the NR network to the LTE network, and, a core network (5G Core, or 5GC) for the NR network remains unchanged, an AMF of the 5GC remains unchanged, and the 5GC serving the NR network simultaneously serves the LTE network.

In a second handover mode, the RAT of the terminal device is handed over from the NR network to the LTE network, and, the 5GC for the NR network remains unchanged, the AMF of the 5GC is switched from a source AMF to a target AMF, and the 5GC serving the NR network simultaneously serves the LTE network.

In a third handover mode, the RAT of the terminal device is handed over from the NR network to the LTE network, and, the 5GC for the NR network is switched to an evolved packet core (Evolved Packet Core, EPC) for the LTE network.

In an embodiment, the handover in the first handover mode can be HO based on an Xn interface.

In an embodiment, the handover in the second handover mode can be HO based on an N2 interface.

In an embodiment, the access network device triggers a handover in the first handover mode, the second handover mode, or the third handover mode.

At 220, if the device identity of the target access network device exists in a first set, the first device determines that the RAT of the terminal device is being handed over from the first radio access network to the second radio access network for a purpose of performing a voice service, where the first set includes all access network device identities under the second radio access network in the overlapped area.

In an embodiment, the first set is pre-configured.

In an embodiment, the method 200 further includes that:

the first device determines that a flow/bearer with an ongoing voice service needs to be handed over to the second radio access network.

Specifically, the AMF device determines that a flow with 5QI=1 and with an ongoing voice service also needs to be handed over to the LTE network.

It should be understood that in the NR network, a flow is used for performing the voice service, while in the LTE network, a bearer is used for performing the voice service.

In an embodiment, a quality of service (Quality of Service, QoS) identifier class can be used to distinguish bearers/flows used for different services.

For example, in the LTE network, a QoS class identifier (QoS Class Identifier, QCI) can include 9 classes (1-9), where a bearer with QCI=1 is used for the voice service, a bearer with QCI=2 is used for a video service, and a bearer with QCI=9 is used for a data service.

For another example, in the NR network, a 5G quality of service identifier (5G Quality of Service Identifier, 5QI) under the 5G network can also include multiple classes. For example, a flow with 5QI=1 can be used for the voice service.

In an embodiment, if the device identity of the target access network device exists in the first set and the first device determines that the flow/bearer with the ongoing voice service needs to be handed over to the second radio access network, the first device determines that the RAT of the terminal device is being handed over from the first radio access network to the second radio access network for the purpose of performing the voice service.

In an embodiment, when two conditions that the device identity of the target access network device exists in the first set and that the first device determines that the flow/bearer with the ongoing voice service needs to be handed over to the second radio access network, are both fulfilled, the first device determines that the RAT of the terminal device is being handed over from the first radio access network to the second radio access network for the purpose of performing the voice service.

In an embodiment, the method 200 further includes that:

the AMF device sends indicating information to a second device, where the indicating information includes a voice identifier and/or a pre-handover public land mobile network (Public Land Mobile Network, PLMN) identifier, and the indicating information is used for indicating to the second device that the RAT of the terminal device is being handed over from the NR network to the LTE network for the purpose of performing the voice service.

In an embodiment, the voice identifier can be used to indicate to the second device that the RAT of the terminal device is being handed over from the NR network to the LTE network for the purpose of performing the voice service.

In an embodiment, the voice identifier can be an identifier identifying the purpose of the network fallback.

In an embodiment, in the first handover mode, the AMF device sends the indicating information to a session management function (Session Management Function, SMF) device.

In an embodiment, in the second handover mode, the source AMF device sends the indicating information to the target AMF device.

In an embodiment, in the third handover mode, the AMF device sends the indicating information to an MME device.

Therefore, in the method for determining a voice fallback in the embodiments of the present disclosure, in the process of handing over the RAT of the terminal device from the first radio access network to the second radio access network, if the device identity of the target access network device under the second radio access network that the terminal device is to access exists in the first set, the first device determines that the RAT of the terminal device is being handed over from the first radio access network to the second radio access network for the purpose of performing the voice service. Thus, when the terminal device undergoes a network handover, an accurate determination can be made on whether the handover is intended for the voice service. Further, after the handover, the voice service can be quickly performed, reducing the signaling overhead incurred from determining the voice service.

Figure 4:
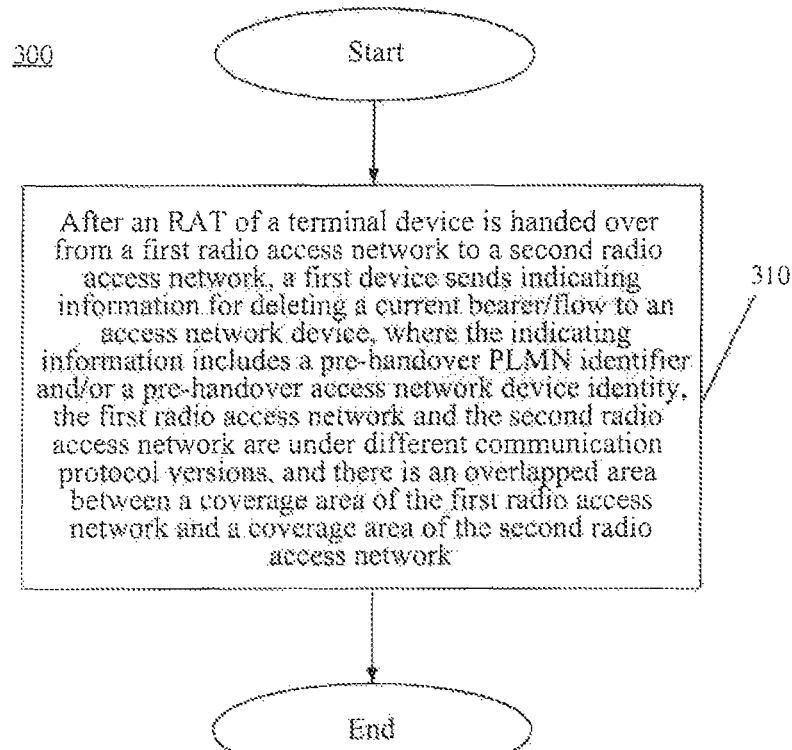
FIG. 4 is a schematic flowchart of a method for returning after a network handover according to embodiments of the present disclosure.

FIG. 4 is a schematic flowchart of a method 300 for returning after a network handover according to embodiments of the present disclosure. As shown in FIG. 4, the access network device can be the access network device shown in FIG. 1, the terminal device can be the terminal device shown in FIG. 1, and the first device can be the core network device shown in FIG. 1. The method 300 includes the following.

At 310, after an RAT of a terminal device is handed over from a first radio access network to a second radio access network, a first device sends indicating information for deleting a current bearer/flow to an access network device, where the indicating information includes a pre-handover PLMN identifier and/or a pre-handover access network device identity, the first radio access network and the second radio access network are under different communication protocol versions, and there is an overlapped area between a coverage area of the first radio access network and a coverage area of the second radio access network.

In an embodiment, the current bearer/flow is a bearer/flow for performing a voice service.

In an embodiment, after the terminal device completes the voice service, the first device sends the indicating information for deleting the current bearer/flow to the access network device.

In an embodiment, the current bearer/flow can be a bearer/flow established before the handover, and can also be a bearer/flow established after the handover.

In an embodiment, the first radio access network is an NR network, and the second radio access network is an LTE network.

In an embodiment, the first device is an AMF device or an MME device, and the access network device is a gNB for the NR network.

In an embodiment, the method 300 further includes that: the first device obtains the pre-handover PLMN identifier and/or the pre-handover access network device identity.

In an embodiment, if the first device is the AMF device and the RAT of the terminal device is handed over from the NR network to the LTE network in the first handover mode, the AMF device obtains the pre-handover PLMN identifier and/or the pre-handover access network device identity from a pre-handover access network device.

In an embodiment, if the first device is the AMF device and the RAT of the terminal device is handed over from the NR network to the LTE network in the second handover mode, the target AMF device obtains the pre-handover PLMN identifier and/or the pre-handover access network device identity from the source AMF device.

In an embodiment, if the first device is the MME device and the RAT of the terminal device is handed over from the NR network to the LTE network in the third handover mode, the MME device obtains the pre-handover PLMN identifier and/or the pre-handover access network device identity from an AMF device.

It should be understood that, for the steps in the method 300 for returning after a network handover, reference may be made to the description of the corresponding steps in the method 200 for determining a voice fallback, which will not be repeated here for the sake of brevity.

Therefore, in the method for returning after a network handover in the embodiments of the present disclosure, after the RAT of the terminal device is handed over from the first radio access network to the second radio access network, the first device sends the indicating information for deleting the current bearer/flow to the access network device, and the indicating information includes the per-handover PLMN identifier and/or the pre-handover access network device identity, according to which the access network device can thus determine to trigger the RAT of the terminal device to return from the second radio access network to the first radio access network, thus enabling the terminal device to experience the first radio access network to the greatest extent while improving the user experience.

Figure 5:
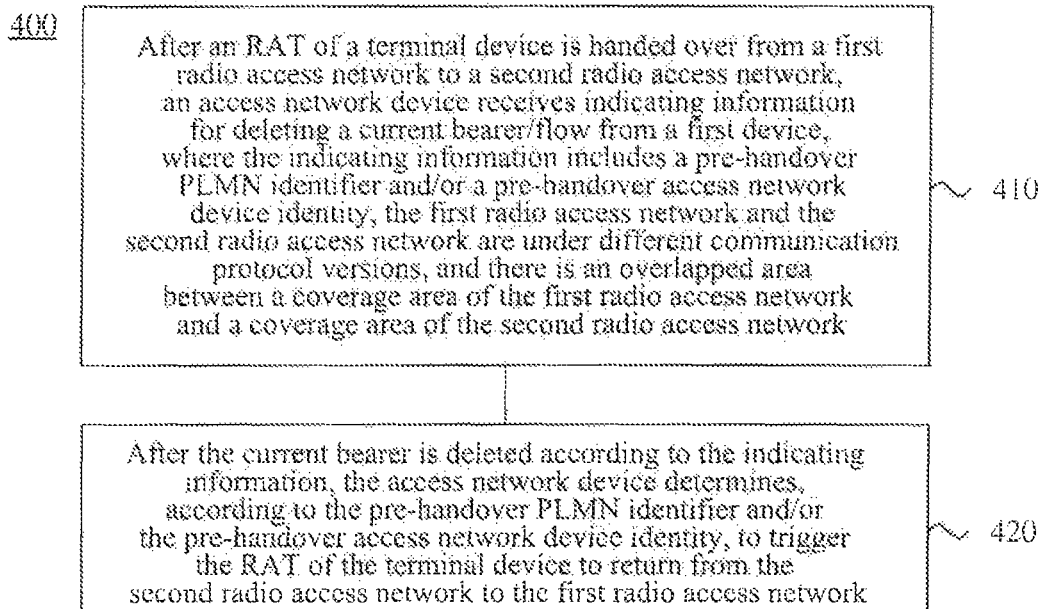
FIG. 5 is a schematic flowchart of another method for returning after a network handover according to embodiments of the present disclosure.

FIG. 5 is a schematic flowchart of a method 400 for returning after a network handover according to embodiments of the present disclosure. As shown in FIG. 5, the access network device can be the access network device shown in FIG. 1, the terminal device can be the terminal device shown in FIG. 1, and the first device can be the core network device shown in FIG. 1. The method 400 includes the following.

At 410, after a radio access technology RAT of a terminal device is handed over from a first radio access network to a second radio access network, an access network device receives indicating information for deleting a current bearer/flow from a first device, where the indicating information includes a pre-handover PLMN identifier and/or a pre-handover access network device identity, the first radio access network and the second radio access network are under different communication protocol versions, and there is an overlapped area between a coverage area of the first radio access network and a coverage area of the second radio access network.

In an embodiment, the current bearer/flow is a bearer/flow for performing a voice service.

In an embodiment, the deleting the current bearer/flow can refer to releasing the current bearer/flow.

In an embodiment, the first radio access network is an NR network, and the second radio access network is an LTE network.

In an embodiment, the access network device is a gNB for the NR network, and the first device is an AMF device or an MME device.

At 420, after the current bearer is deleted according to the indicating information, the access network device determines, according to the pre-handover PLMN identifier and/or the pre-handover access network device identity, to trigger the RAT of the terminal device to return from the second radio access network to the first radio access network.

In an embodiment, the RAT of the terminal device can return from the second radio access network to the first radio access network in two handover modes as the following.

In a first handover mode, a core network (5G core, 5GC) for the NR network remains unchanged. At this time, the first device is the AMF device or a target AMF device, and the access network device is the gNB.

In a second handover mode, an evolved packet core (Evolved Packet Core, EPC) for the LTE network is switched back to a 5GC for the NR network. At this time, the first device is the MME device, and the access network device is the gNB.

It should be understood that, for the steps in the method 400 for returning after a network handover, reference may be made to the description of the corresponding steps in the method 200 for determining a voice fallback, which will not be repeated here for the sake of brevity.

Therefore, in the method for returning after a network handover in the embodiments of the present disclosure, after the RAT of the terminal device is handed over from the first radio access network to the second radio access network, the first device sends the indicating information for deleting the current bearer/flow to the access network device, and the indicating information includes the pre-handover PLMN identifier and/or the pre-handover access network device identity, according to which the access network device can thus determine to trigger the RAT of the terminal device to return from the second radio access network to the first radio access network, thus enabling the terminal device to experience the first radio access network to the greatest extent while improving the user experience.

Figure 6:
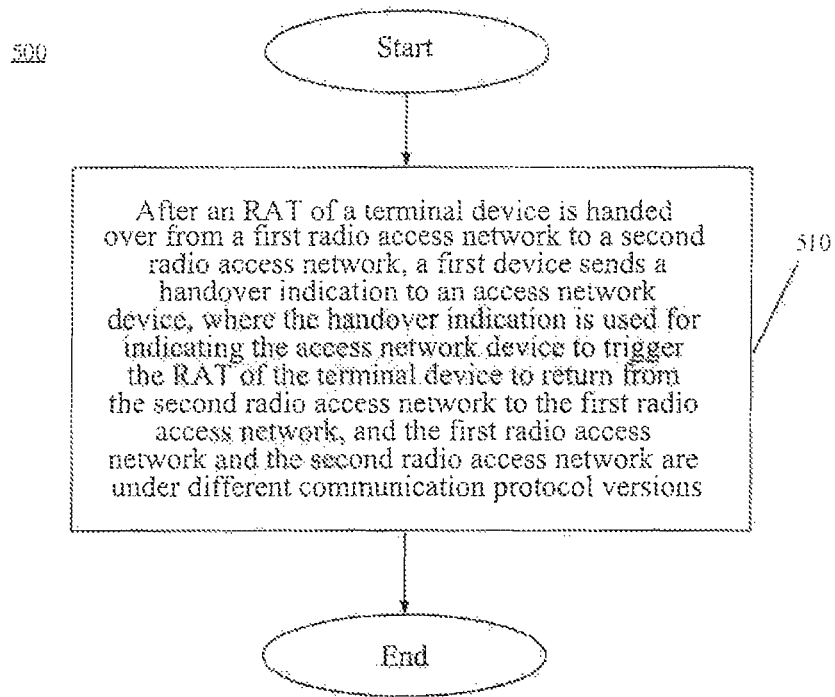
FIG. 6 is a schematic flowchart of still another method for returning after a network handover according to embodiments of the present disclosure.

FIG. 6 is a schematic flowchart of a method 500 for returning after a network handover according to embodiments of the present disclosure. As shown in FIG. 6, the access network device can be the access network device shown in FIG. 1, the terminal device can be the terminal device shown in FIG. 1, and the first device can be the core network device shown in FIG. 1. The method 500 includes the following.

At 510, after an RAT of a terminal device is handed over from a first radio access network to a second radio access network, a first device sends a handover indication to an access network device, where the handover indication is used for indicating the access network device to trigger the RAT of the terminal device to return from the second radio access network to the first radio access network, and the first radio access network and the second radio access network are under different communication protocol versions.

In an embodiment, the first radio access network can be an NR network, and the second radio access network can be an LTE network.

In an embodiment, when the terminal device needs to perform a voice service, the RAT of the terminal device is handed over from the first radio access network to the second radio access network.

In a 5G NR network deployment, the network may not support the voice service. Hence, when the terminal device needs to perform the voice service, it needs to fall back (or be handed over) from the NR network to the LTE network.

In an embodiment, when the first radio access network is in a congested state, the RAT of the terminal device is handed over from the first radio access network to the second radio access network.

In an embodiment, the first device is an access and mobility management function (Access and Mobility Management Function, AMF) device or a session management function (Session Management Function, SMF) device or a session management function+core packet gateway (Session Management Function+Core Packet Gateway, SMF+PGW-C) device, and the access network device is an evolved universal terrestrial radio access network (Evolved Universal Terrestrial Radio Access Network, E-UTRAN) device.

In an embodiment, the RAT of the terminal device can return from the second radio access network to the first radio access network in two handover modes as the following.

In a first handover mode, a core network (5G core, 5GC) for the NR network remains unchanged. At this time, the first device is the AMF device or the SMF device, and the access network device is the E-UTRAN device.

In a second handover mode, an evolved packet core (Evolved Packet Core, EPC) for the LTE network is switched back to a 5GC for the NR network. At this time, the first device is the SMF+PGW-C device, and the access network device is the E-UTRAN device.

In an embodiment, after the RAT of the terminal device is handed over from the first radio access network to the second radio access network and before the first device sends the handover indication to the access network device, the method 200 further includes that:

the first device triggers the access network device to establish a first bearer/flow for the terminal device, where the first bearer/flow is used for performing a voice service under the second radio access network.

It should be understood that in the NR network, a flow is used for performing the voice service, while in the LTE network, a bearer is used for performing the voice service.

In an embodiment, a quality of service (Quality of Service, QoS) identifier class can be used to distinguish bearers/flows used for different services.

For example, in the LTE network, a QoS class identifier (QoS Class Identifier, QCI) can include 9 classes (1-9), where a bearer with QCI=1 is used for the voice service, a bearer with QCI=2 is used for a video service, and a bearer with QCI=9 bearer is used for a data service.

For another example, in the NR network, a 5G quality of service identifier (5G Quality of Service Identifier, 5QI) under the 5G network can also include multiple classes. For example, a flow with 5QI=1 is used for the voice service.

In an embodiment, after the access network device receives the handover indication, the RAT of the terminal device is triggered according to the handover indication to return from the second radio access network to the first radio access network.

For example, after the RAT of the terminal device is handed over (or falls back) from the NR network to the LTE network, the access network device can return from the LTE network to the NR network according to the handover indication, thereby enabling the terminal device to use the NR network to the greatest extent while improving the user experience.

Therefore, in the method for returning after a network handover in the embodiments of the present disclosure, after the RAT of the terminal device is handed over from the first radio access network to the second radio access network, the first device sends the handover indication to the access network device, so that the access network device returns from the second radio access network to the first radio access network, thus enabling the terminal device to use the first radio access network to the greatest extent while improving the user experience.

Figure 7:
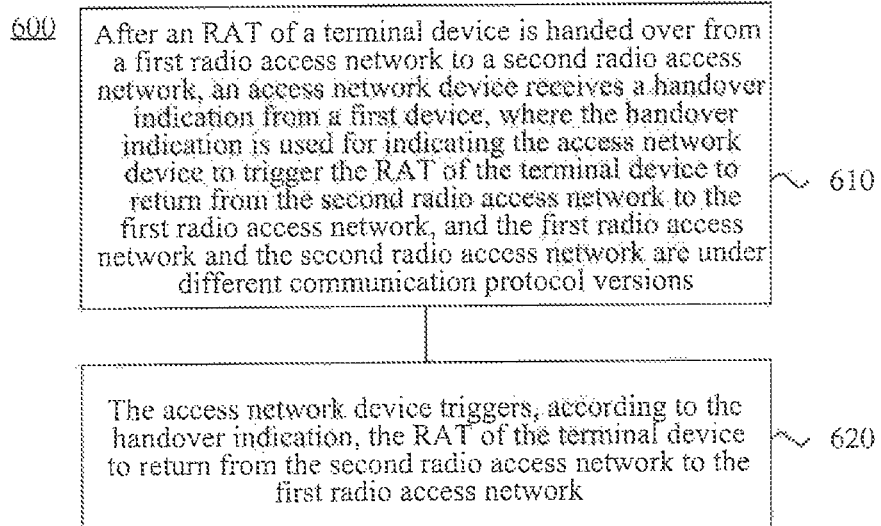
FIG. 7 is a schematic flowchart of still another method for returning after a network handover according to embodiments of the present disclosure.

FIG. 7 is a schematic flowchart of a method 600 for returning after a network handover according to embodiments of the present disclosure. As shown in FIG. 7, the access network device can be the access network device shown in FIG. 1, the terminal device can be the terminal device shown in FIG. 1, and the first device can be the core network device shown in FIG. 1. The method 600 includes the following.

At 610, after an RAT of a terminal device is handed over from a first radio access network to a second radio access network, an access network device receives a handover indication from a first device, where the handover indication is used for indicating the access network device to trigger the RAT of the terminal device to return from the second radio access network to the first radio access network, and the first radio access network and the second radio access network are under different communication protocol versions.

In an embodiment, when the terminal device needs to perform a voice service, the RAT of the terminal device is handed over from the first radio access network to the second radio access network.

In an embodiment, the first radio access network is an NR network, and the second radio access network is an LTE network.

In an embodiment, the first device is an AMF device or an SMF device or an SMF+PGW-C device, and the access network device is an E-UTRAN device.

In an embodiment, when the terminal device needs to perform the voice service, the access network device triggers the RAT of the terminal device to be handed over from the first radio access network to the second radio access network.

In an embodiment, after the RAT of the terminal device is handed over from the first radio access network to the second radio access network, and before the access network device receives the handover indication from the first device, the access network device triggers the establishment of a bearer/flow used for performing the voice service for the terminal device.

For example, a bearer with QCI=1 is established to perform the voice service for the terminal device.

At 620, the access network device triggers, according to the handover indication, the RAT of the terminal device to return from the second radio access network to the first radio access network.

In an embodiment, if the first device is the AMF device or the SMF device, and the access network device is the E-UTRAN device, the access network device triggers, in a first handover mode and according to the handover indication, the RAT of the terminal device to return from the second radio access network to the first radio access network.

In the first handover mode, a 5GC for the NR network remains unchanged.

In an embodiment, if the handover indication from the first device is an Intra RAT handover (Hand Over, HO), the access network device triggers a network return based on the first handover mode.

In an embodiment, the Intra RAT HO can be HO based on an Xn interface, and can also be HO based on an N2 interface.

It should be understood that the Xn interface is an interface between 5G radio access networks (Radio Access Networks, RANs), and the N2 interface is a signaling plane interface between the RAN and the AMF.

In an embodiment, if the first device is the SMF+PGW-C device, and the access network device is the E-UTRAN device, the access network device triggers, in a second handover mode and according to the handover indication, the RAT of the terminal device to return from the second radio access network to the first radio access network;

where an EPC for the LTE network is switched back to a 5GC for the NR network in the second handover mode.

In an embodiment, if the handover indication from the first device is an Inter EPS/5GS HO, the access network device triggers a network return based on the second handover mode, where EPS is a collective name for E-UTRAN and EPC, and 5GS is a collective name for 5GC and 5G radio access network.

In an embodiment, the first radio access network is better than the second radio access network, and the user can have a better experience under the first radio access network.

It should be understood that, for the steps in the method 600 for returning after a network handover, reference may be made to the description of the corresponding steps in the method 200 for determining a voice fallback or the method 500 for returning after a network handover, which will not be repeated here for the sake of brevity.

Therefore, in the method for returning after a network handover in the embodiments of the present disclosure, after the RAT of the terminal device is handed over from the first radio access network to the second radio access network, the first device sends the handover indication to the access network device, so that the access network device returns from the second radio access network to the first radio access network, thus enabling the terminal device to use the first radio access network to the greatest extent while improving the user experience.

Figure 8:
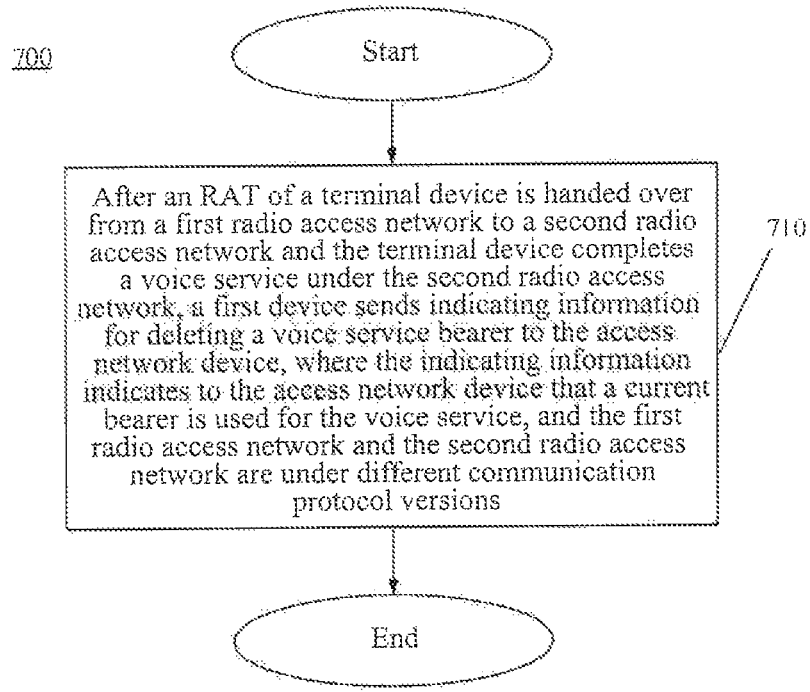
FIG. 8 is a schematic flowchart of still another method for returning after a network handover according to embodiments of the present disclosure.

FIG. 8 is a schematic flowchart of a method 700 for returning after a network handover according to embodiments of the present disclosure. As shown in FIG. 8, the access network device can be the access network device shown in FIG. 1, the terminal device can be the terminal device shown in FIG. 1, and the first device can be the core network device shown in FIG. 1. The method 700 includes the following.

At 710, after an RAT of a terminal device is handed over from a first radio access network to a second radio access network and the terminal device completes a voice service under the second radio access network, a first device sends indicating information for deleting a voice service bearer to the access network device, where the indicating information indicates to the access network device that a current bearer is used for the voice service, and the first radio access network and the second radio access network are under different communication protocol versions.

In an embodiment, when the terminal device needs to perform the voice service, the RAT is handed over from the first radio access network to the second radio access network.

In an embodiment, after the RAT of the terminal device is handed over from the first radio access network to the second radio access network, the first device can trigger the access network device to establish a bearer/flow used for performing the voice service for the terminal device.

In an embodiment, the access network device deletes the current bearer according to the indicating information.

In an embodiment, after the access network device deletes the current bearer according to the indicating information, the access network device can trigger the RAT of the terminal device to return from the second radio access network to the first radio access network.

In an embodiment, the first radio access network is an NR network, and the second radio access network is an LTE network.

In an embodiment, the first device is an AMF device or an SMF device or an SMF+PGW-C device, and the access network device is an E-UTRAN device.

In an embodiment, that the first device sends the indicating information to the access network device includes that:

the AMF device or the SMF device or the SMF+PGW-C device sends the indicating information to the E-UTRAN device.

It should be understood that, for the steps in the method 700 for returning after a network handover, reference may be made to the description of the corresponding steps in the method 200 for determining a voice fallback, or the method 500 for returning after a network handover, or the method 600 for returning after a network handover, which will not be repeated here for the sake of brevity.

Therefore, in the method for returning after a network handover in the embodiments of the present disclosure, after the RAT of the terminal device is handed over from the first radio access network to the second radio access network and the terminal device completes the voice service under the second radio access network, the first device sends the indicating information for deleting the voice service bearer to the access network device, so that after the access network device deletes the current bearer according to the indicating information, the access network device determines to trigger the RAT of the terminal device to return from the second radio access network to the first radio access network, thus enabling the terminal device to experience the first radio access network to the greatest extent while improving the user experience.

FIG. 9 is a schematic flowchart of a method 800 for returning after a network handover according to embodiments of the present disclosure. As shown in FIG. 9, the access network device can be the access network device shown in FIG. 1, the terminal device can be the terminal device shown in FIG. 1, and the first device can be the core network device shown in FIG. 1. The method 800 includes the following.

At 810, after a radio access technology RAT of a terminal device is handed over from a first radio access network to a second radio access network and the terminal device completes a voice service under the second radio access network, the access network device receives indicating information for deleting a voice service bearer from a first device, where the indicating information indicates to the access network device that a current bearer is used for the voice service, and the first radio access network and the second radio access network are under different communication protocol versions.

In an embodiment, the first radio access network is an NR network, and the second radio access network is an LTE network.

In an embodiment, the first device is an AMF device or an SMF device or an SMF+PGW-C device, and the access network device is an E-UTRAN device.

In an embodiment, the E-UTRAN device receives the indicating information from the AMF device or the SMF device or the SMF+PGW-C device.

At 820, after the current bearer is deleted according to the indicating information, the access network device triggers the RAT of the terminal device to return from the second radio access network to the first radio access network.

In an embodiment, if the access network device is currently connected to a 5GC for the NR network, the access network device triggers, in a first handover mode, the RAT of the terminal device to return from the second radio access network to the first radio access network, where the 5GC for the NR network remains unchanged.

In an embodiment, if the access network device is currently connected to an EPC for the LTE network, the access network device triggers, in a second handover mode, the RAT of the terminal device to return from the second radio access network to the first radio access network, where the EPC for the LTE network is switched back to the 5GC for the NR network in the second handover mode.

It should be understood that, for the steps in the method 800 for returning after a network handover, reference may be made to the description of the corresponding steps in the method 700 for returning after a network handover, which will not be repeated here for the sake of brevity.

Therefore, in the method for returning after a network handover in the embodiments of the present disclosure, after the RAT of the terminal device is handed over from the first radio access network to the second radio access network and the terminal device completes the voice service under the second radio access network, the first device sends the indicating information for deleting the voice service bearer to the access network device, so that after the access network device deletes the current bearer according to the indicating information, the access network device determines to trigger the RAT of the terminal device to return from the second radio access network to the first radio access network, thereby enabling the terminal device to use the first radio access network to the greatest extent and thus improving the user experience.

FIG. 10 is a schematic flowchart of a method 900 for indicating a purpose of a network handover according to embodiments of the present disclosure. As shown in FIG. 10, the access network device can be the access network device shown in FIG. 1, the terminal device can be the terminal device shown in FIG. 1, and the first device can be the core network device shown in FIG. 1. The method 900 includes the following.

At 910, a first device obtains a fallback identifier in a process of handing over an RAT of a terminal device from a first radio access network to a second radio access network, where the fallback identifier is used for indicating a purpose of handing over the RAT of the terminal device from the first radio access network to the second radio access network, and the first radio access network and the second radio access network are under different communication protocol versions.

In an embodiment, the fallback identifier can be some parameter information indicating a purpose of the fallback.

In an embodiment, the fallback identifier indicates that the purpose of handing over the RAT of the terminal device from the first radio access network to the second radio access network is to establish for the terminal device a voice service under the second radio access network.

In an embodiment, the fallback identifier can also indicate that the RAT of the terminal device is handed over from the first radio access network to the second radio access network for the purpose of performing a service other than the voice service, such as a video service.

In an embodiment, the first device can be an AMF device, an SMF device, or an SMF+PGW-C device.

In an embodiment, after obtaining the fallback identifier, the first device triggers, according to the fallback identifier, the access network device to perform a task for returning the RAT of the terminal device from the second radio access network to the first radio access network.

In an embodiment, the first radio access network is an NR network, and the second radio access network is an LTE network.

In an embodiment, the RAT of the terminal device can be handed over from the first radio access network to the second radio access network in three handover modes as the following.

In a first handover mode, the RAT of the terminal device is handed over from the first radio access network to the second radio access network. In the first handover mode, a 5GC for the NR network remains unchanged, an AMF of the 5GC remains unchanged, and the 5GC serving the NR network simultaneously serves the LTE network.

In a second handover mode, the RAT of the terminal device is handed over from the first radio access network to the second radio access network. In the second handover mode, the 5GC for the NR network remains unchanged, the AMF of the 5GC is switched from a source AMF to a target AMF, and the 5GC serving the NR network simultaneously serves the LTE network.

In a third handover mode, the RAT of the terminal device is handed over from the first radio access network to the second radio access network. In the third handover mode, the 5GC for the NR network is switched to an EPC for the LTE network.

In an embodiment, the handover in the first handover mode can be 1-HO based on an Xn interface.

In an embodiment, when performing the network handover based on the first handover mode, the first device is the AMF device. In an embodiment, the access network device triggers the handover in the first handover mode.

In an embodiment, if the RAT of the terminal device is handed over from the first radio access network to the second radio access network in the first handover mode, the AMF device receives the fallback identifier from the access network device. In an embodiment, after the AMF device receives the fallback identifier from the access network device, the AMF device sends the fallback identifier to the SMF device.

In an embodiment, when the RAT of the terminal device is handed over from the first radio access network to the second radio access network in the first handover mode, the fallback identifier is stored at the AMF device and the SMF device.

In an embodiment, the handover in the second handover mode can be HO based on an N2 interface.

In an embodiment, when performing the network handover based on the second handover mode, the first device is the SMF device. In an embodiment, the access network device triggers the handover in the second handover mode.

In an embodiment, if the RAT of the terminal device is handed over from the first radio access network to the second radio access network in the second handover mode, the SMF device receives the fallback identifier from the access network device.

Specifically, the SMF device receives the fallback identifier forwarded by the target AMF device from the source AMF device, where the fallback identifier is obtained by the source AMF device from the access network device.

In an embodiment, if the RAT of the terminal device is handed over from the first radio access network to the second radio access network in the second handover mode, the fallback identifier is stored at the source AMF device, the target AMF device and the SMF device.

In an embodiment, when performing the network handover based on the second handover mode, the first device is a target access network device. If the RAT of the terminal device is handed over from the first radio access network to the second radio access network in the second handover mode, the target access network device receives the fallback identifier from the source access network device.

In an embodiment, when performing the network handover based on the third handover mode, the first device is the SMF+PGW-C device. In an embodiment, the access network device triggers the handover in the third handover mode.

In an embodiment, if the RAT of the terminal device is handed over from the first radio access network to the second radio access network in the third handover mode, the SMF+PGW-C device receives the fallback identifier from the access network device.

Specifically, the SMF+PGW-C device receives the fallback identifier forwarded by an AMF device from the access network device.

In an embodiment, if the RAT of the terminal device is handed over from the first radio access network to the second radio access network in the third handover mode, the fallback identifier is stored at the AMF device and the SMF+PGW-C device.

It should be understood that, for the steps in the method 900 for indicating a purpose of a network handover, reference may be made to the description of the corresponding steps in the method 200 for determining a voice fallback or the method 500 for returning after a network handover, which will not be repeated here for the sake of brevity.

Therefore, in the method for indicating a purpose of a network handover in the embodiments of the present disclosure, the first device triggers, according to the fallback identifier obtained in the process of handing over the RAT of the terminal device from the first radio access network to the second radio access network, a return from the second radio access network to the first radio access network, thus ensuring maximum use of the first radio access network by the terminal device and thus improving the user experience.

Figure 11:
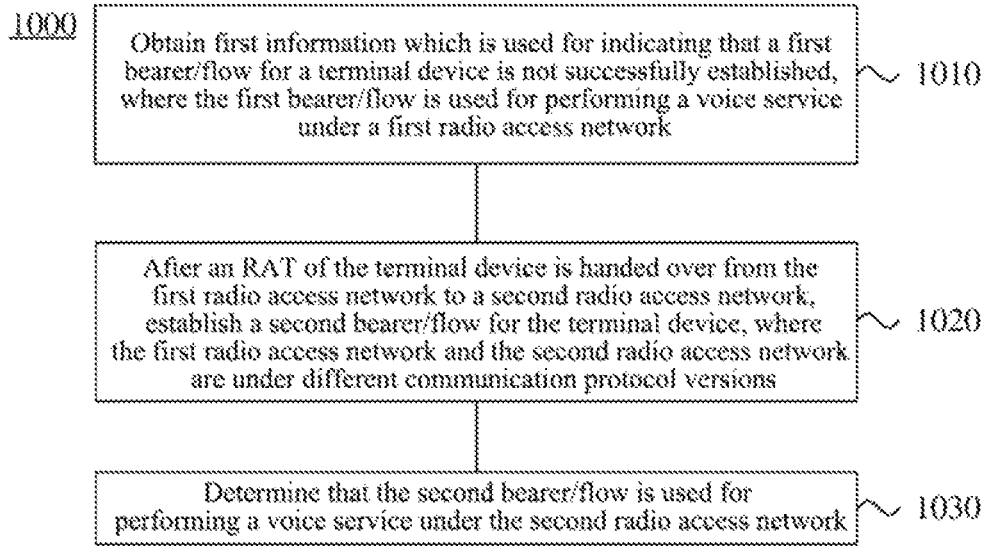
FIG. 11 is a schematic flowchart of a method for determining a voice service according to embodiments of the present disclosure.

FIG. 11 is a schematic flowchart of a method 1000 for determining a voice service according to embodiments of the present disclosure. As shown in FIG. 11, the access network device can be the access network device shown in FIG. 1, and the terminal device can be the terminal device shown in FIG. 1. The method 1000 includes the following.

At 1010, obtain first information which is used for indicating that a first bearer/flow for a terminal device is not successfully established, where the first bearer/flow is used for performing a voice service under a first radio access network.

At 1020, after an RAT of the terminal device is handed over from the first radio access network to a second radio access network, establish a second bearer/flow for the terminal device, where the first radio access network and the second radio access network are under different communication protocol versions.

In an embodiment, a purpose of handing over the RAT of the terminal device from the first radio access network to the second radio access network is to establish the second bearer/flow.

In an embodiment, the first radio access network is an NR network, and the second radio access network is an LTE network.

In an embodiment, the RAT of the terminal device is handed over from the first radio access network to the second radio access network in a first handover mode, where in the first handover mode, a core network for the first radio access network remains unchanged, an internal network element of the core network remains unchanged, and the core network serving the first radio access network simultaneously serves the second radio access network.

In an embodiment, the first radio access network is the NR network, the second radio access network is the LTE network, and in the first handover mode, a 5GC for the NR network remains unchanged, an AMF of the 5GC remains unchanged, and the 5GC serving the NR network simultaneously serves the LTE network.

In an embodiment, the RAT of the terminal device is handed over from the first radio access network to the second radio access network in a second handover mode, where in the second handover mode, a core network for the first radio access network remains unchanged, an internal network element of the core network changes, and the core network serving the first radio access network simultaneously serves the second radio access network.

In an embodiment, the first radio access network is the NR network, the second radio access network is the LTE network, and in the second handover mode, a 5GC for the NR network remains unchanged, an AMF of the 5GC is switched from a source AMF to a target AMF, and the 5GC serving the NR network simultaneously serves the LTE network.

In an embodiment, when performing the network handover based on the first handover mode or the second handover mode, the first bearer/flow is a flow with 5QI=1, and the second bearer/flow is also a flow with 5QI=1.

In an embodiment, the RAT of the terminal device is handed over from the first radio access network to the second radio access network in a third handover mode, where a core network for the first radio access network is switched to a core network for the second radio access network in the third handover mode.

In an embodiment, the first radio access network is the NR network, the second radio access network is the LTE network, and a 5GC for the NR network is switched to an EPC for the LTE network in the third handover mode.

In an embodiment, when performing the network handover based on the third handover mode, the first bearer/flow is a flow with 5QI=1, and the second bearer/flow is a bearer with QCI=1.

At 1030, determine that the second bearer/flow is used for performing a voice service under the second radio access network.

In an embodiment, after the second bearer/flow is released, the RAT of the terminal device can be triggered to return from the second radio access network to the first radio access network.

It should be understood that, for the steps in the method 1000 for determining a voice service, reference may be made to the description of the corresponding steps in the method 200 for determining a voice fallback or the method 500 for returning after a network handover, which will not be repeated here for the sake of brevity.

Therefore, in the method for determining a voice service in the embodiments of the present disclosure, after receiving the first information which is used for indicating that the first bearer/flow for the terminal device is not successfully established and after handing over the RAT of the terminal device from the first radio access network to the second radio access network, it is determined that the established second bearer/flow is used for performing the voice service under the second radio access network, thus enabling an accurate determination regarding whether the established bearer/flow is intended for performing the voice service.

Figure 12:
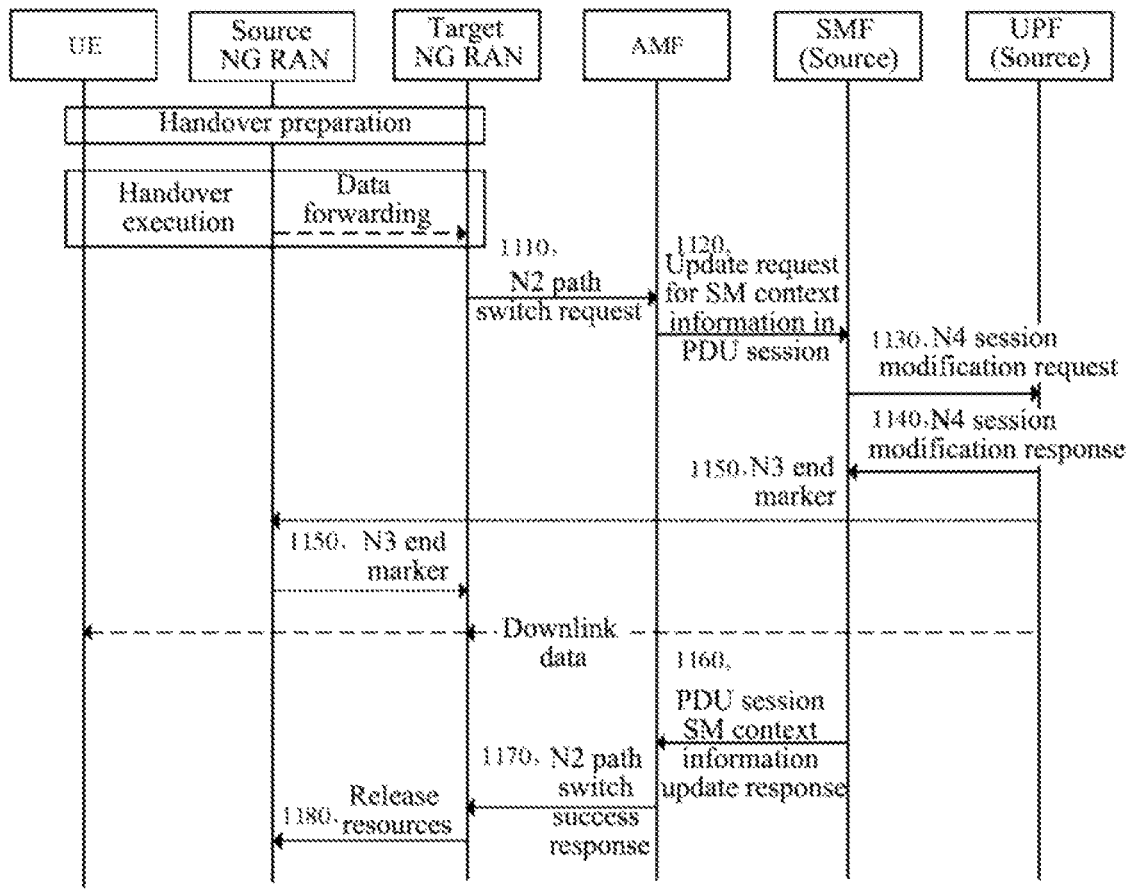
FIG. 12 is a schematic flowchart of a method for network handover according to embodiments of the present disclosure.

As an embodiment, as shown in FIG. 12, the RAT of the terminal device is handed over from the NR network to the LTE network based on an Xn interface handover (with a 5GC for the NR network remaining unchanged, an AMF of the 5GC remaining unchanged, and the 5GC serving the NR network simultaneously serving the LTE network). During the handover based on the Xn interface, the terminal device is handed over from a source NG RAN to a target NG RAN.

At 1110, the target NG RAN sends an N2 path switch request to the AMF.

In an embodiment, before the step 1110, the terminal device (UE), the source NG RAN and the target NG RAN have completed handover preparation and handover execution. During the handover execution, the source NG RAN forwards data to the target NG RAN.

It should be understood that the N2 interface is an interface between the RAN and the AMF.

At 1120, the AMF sends, to the source SMF, update request information for service message (Service Message, SM) context information in a packet data unit (Packet Data Unit, PDU) session.

At 1130, the source SMF sends an N4 session modification request to a source UPF.

It should be understood that the N4 interface is an interface between the SMF and the UPF.

At 1140, the source UPF sends an N4 session modification response to the source SMF.

At 1150, the source UPF sends an N3 end marker to the source NO RAN.

It should be understood that the N3 interface is a user plane interface between the RAN and the UPF.

In an embodiment, the source NG RAN forwards the N3 end marker to the target NG RAN.

In an embodiment, the source UPF can send some unfinished downlink data transmission tasks to the terminal device.

At 1160, the source SMF sends, to the AMF, update response information for the SM context information in the PDU session.

At 1170, the AMF sends an N2 path switch success response to the target NG RAN.

At 1180, the target NG RAN sends information for releasing resources to the source NG RAN.

In an embodiment, at this time, the source NG RAN can release resources for the terminal device. In an embodiment, at this time, the terminal device has been successfully handed over to the target NG RAN.

In the embodiments of the present disclosure, the process of triggering the handover of the RAT of the terminal device from the NR network to the LTE network can be performed based on the handover process shown in FIG. 12.

In the embodiments of the present disclosure, the process of triggering the return of the RAT of the terminal device from the LTE network to the NR network can be performed based on the reverse process of the handover process shown in FIG. 12.

Figure 13:
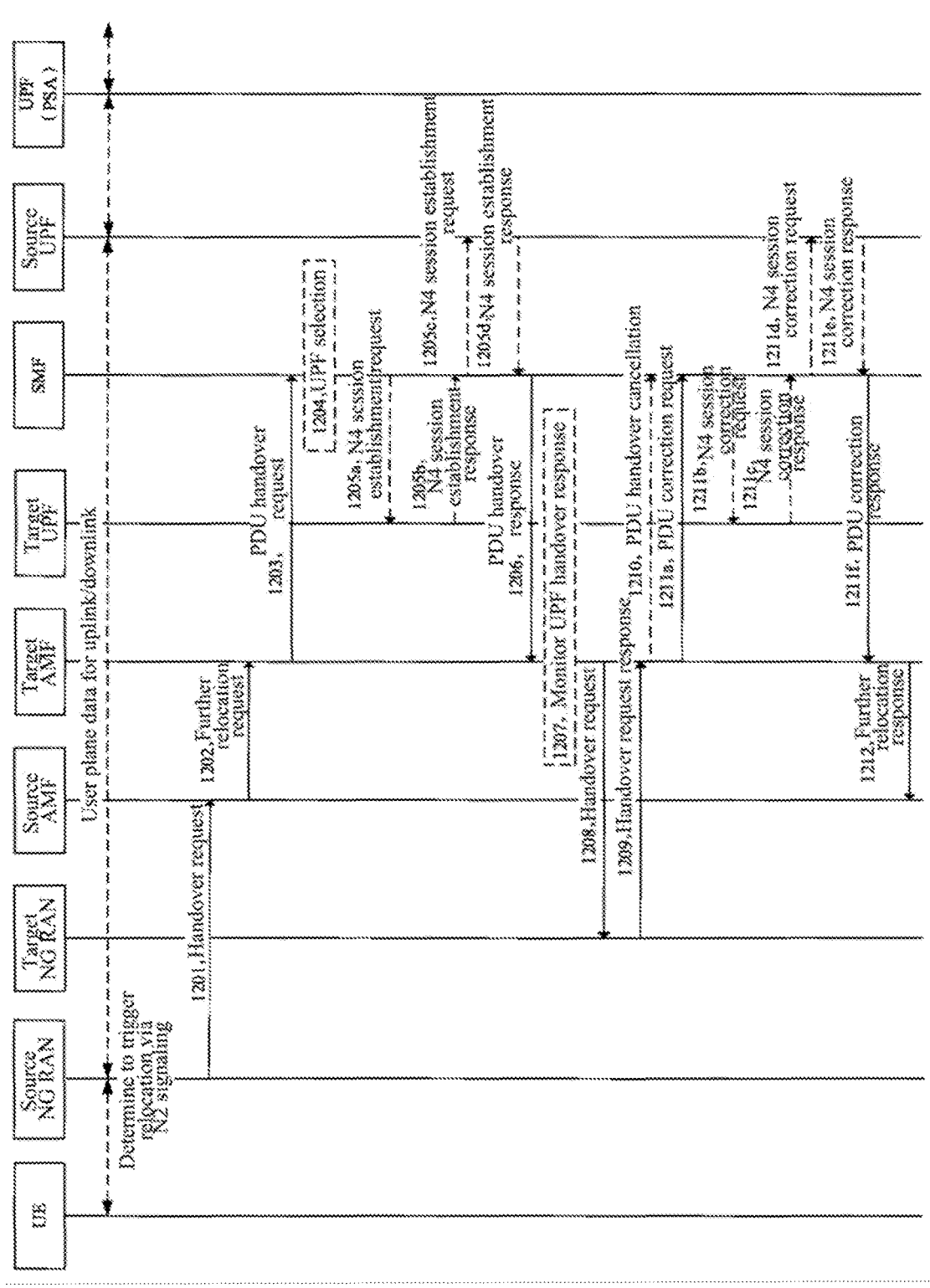
FIG. 13 is a schematic flowchart of another method for network handover according to embodiments of the present disclosure.

As an embodiment, as shown in FIG. 13, the RAT of the terminal device is handed over from the NR network to the LTE network based on an N2 interface handover (with a 5GC for the NR network remaining unchanged, an AMF of the 5GC being switched from a source AMF to a target AMF, and the 5GC serving the NR network simultaneously serving the LTE network). During the handover process based on the N2 interface, the terminal device is handed over from a source NG RAN to a target NG RAN.

At 1201, the source NG RAN sends a handover request to the source AMF.

In an embodiment, before the step 1201, the source NG RAN can determine to trigger a relocation through N2 signaling.

In an embodiment, before the step 1201, the terminal device can exchange user plane data for uplink/downlink with a source UPF via the source NG RAN.

At 1202, the source AMF sends a further relocation request to the target AMF.

At 1203, the target AMF sends a PDU handover request to the SMF.

At 1204, the SMF performs UPF selection.

In an embodiment, the SMF can determine a target UPF.

At 1205*a*, the SMF sends an N4 session establishment request to the target UPE.

At 1205*b*, the target UPF sends an N4 session establishment response to the SMF.

At 1205*c*, the SMF sends an N4 session establishment request to the source UPF.

At 1205*d*, the source UPF sends an N4 session establishment response to the SMF.

At 1206, the SMF sends a PDU handover response to the target AMF.

At 1207, the target AMF monitors the UPF for the handover response.

At 1208, the target AMF sends a handover request to the target NG RAN.

At 1209, the target NG RAN sends a handover request response to the target AMF.

At 1210, the target AMF sends a PDU handover cancellation to the SMF.

At 1211*a*, the target AMF sends a PDU correction request to the SMF.

At 1211*b*, the SMF sends an N4 session correction request to the target UPF.

At 1211*c*, the target UPF sends an N4 session correction response to the SMF.

At 1211*d*, the SMF sends an N4 session correction request to the source UPF.

At 1211*e*, the source UPF sends an N4 session correction response to the SMF.

At 1211*f*, the SMF sends a PDU correction response to the target AMF.

At 1212, the target AMF sends a further relocation response to the source AMF.

In an embodiment, at this time, the source AMF can release related information for the terminal device.

In an embodiment, at this time, the terminal device has successfully been handed over from the source AMF to the target AMF, as well as from the source NG RAN to the target NG RAN.

In the embodiments of the present disclosure, the process of triggering the handover of the RAT of the terminal device from the NR network to the LTE network can be performed based on the handover process shown in FIG. 13.

In the embodiments of the present disclosure, the process of triggering the return of the RAT of the terminal device from the LTE network to the NR network can be performed based on the reverse process of the handover process shown in FIG. 13.

Figure 14:
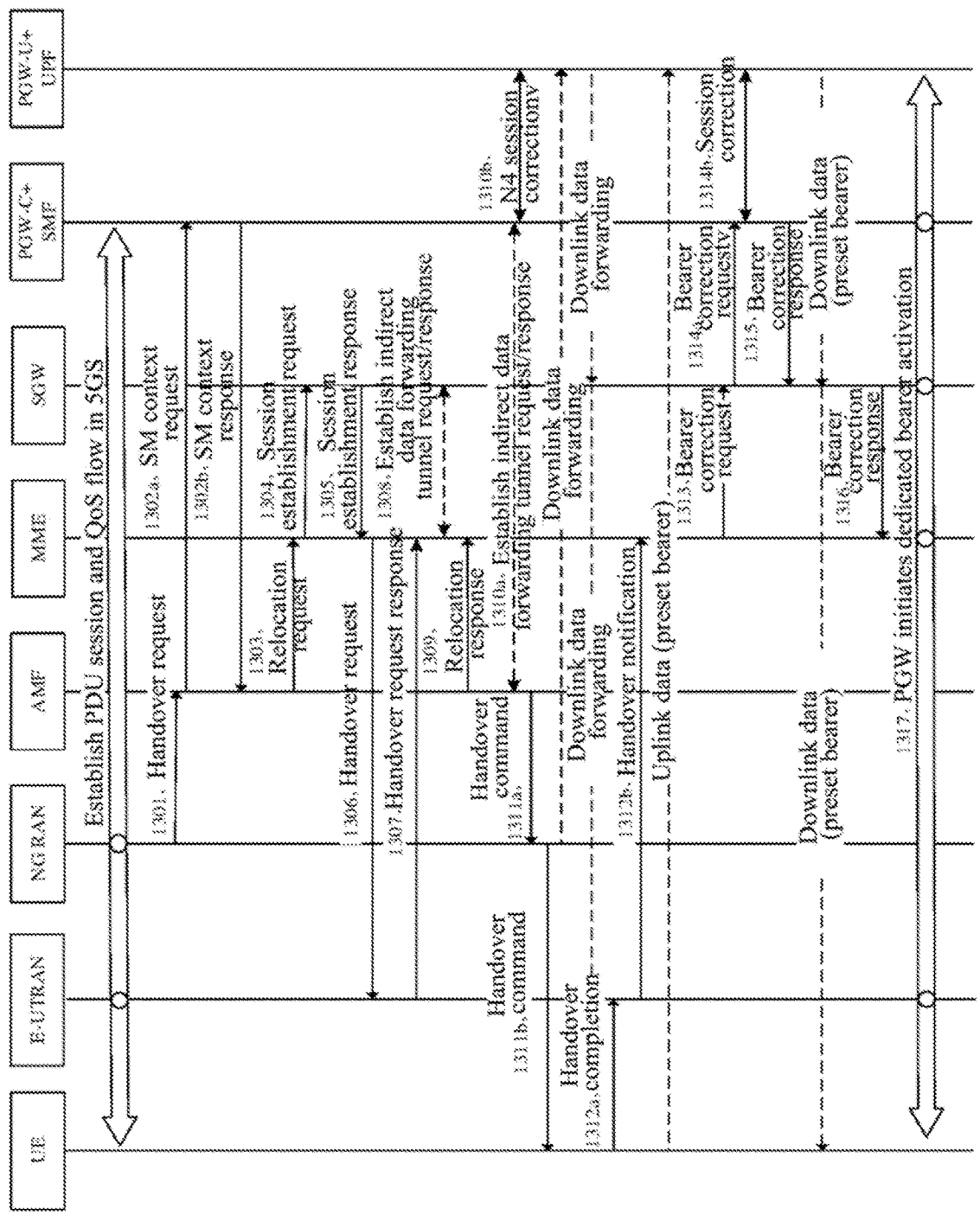
FIG. 14 is a schematic flowchart of still another method for network handover according to embodiments of the present disclosure.

As an embodiment, as shown in FIG. 14, the RAT of the terminal device is handed over from the NR network to the LTE network based on an inter 5GC/EPC handover (with the 5GC for the NR network being switched to an EPC for the LTE network). During the handover process based on the inter 5GC/EPC, the terminal device is handed over from a NG RAN to an E-UTRAN.

At 1301, the NG RAN sends a handover request to an AMF.

At 1302a, the AMF sends an SM context request to a PGW-C+SMF.

At 1302b, the PGW-C+SMF sends an SM context response to the AMF.

At 1303, the AMF sends a relocation request to an MME.

At 1304, the MME sends a session establishment request to an SGW.

At 1305, the SGW sends a session establishment response to the MME.

At 1306, the MME sends a handover request to the E-UTRAN.

At 1307, the E-UTRAN sends a handover request response to the MME.

At 1308, establish an indirect data forwarding tunnel request/response between the MME and the SGW.

At 1309, the AMF sends a relocation response to the MME.

At 1310a, establish an indirect data forwarding tunnel request/response between the AMF and the PGW-C+SMF.

At 1310b, perform N4 session correction between the PGW-C+SMF and a user packet gateway+user plane function (User Packet Gateway+User Plane Function, PGW-U+UPF).

It should be understood that PGW-U+UPF can simultaneously implement the functions of the user packet gateway and the user plane function.

At 1311a, the AMF sends a handover command to the NG RAN.

At 1311b, the NG RAN sends a handover command to a UE.

At 1312a, the UE sends a handover completion to the E-UTRAN.

At 1312b, the E-UTRAN sends a handover notification to the MME.

In an embodiment, the UE can send uplink data to the PGW-U+UPF at this time.

At 1313, the MME sends a bearer correction request to the SGW.

At 1314a, the SGW sends a bearer correction request to the PGW-C+SMF.

At 1314b, perform session correction between the PGW-C+SMF and the PG W-U+UPF.

At 1315, the PGW-C+SMF sends a bearer correction response to the SGW.

In an embodiment, at this time, the PGW-U+UPF can send downlink data to the UE.

At 1316, the SGW sends a bearer correction response to the MME.

At 1317, the PGW-C+SMF initiates dedicated bearer activation to the E-UTRAN, the MME and the SGW.

In an embodiment, at this time, the 5GC for the NR network is switched to the EPC for the LTE network.

In the embodiments of the present disclosure, the process of triggering the handover of the RAT of the terminal device from the NR network to the LTE network can be performed based on the handover process shown in FIG. 14.

In the embodiments of the present disclosure, the process of triggering the return of the RAT of the terminal device from the LTE network to the NR network can be performed based on the reverse process of the handover process shown in FIG. 14.

Figure 15:
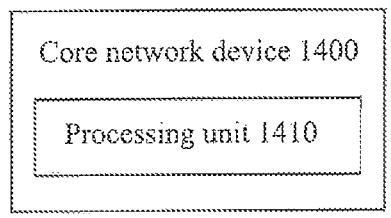
FIG. 15 is a schematic block diagram of a core network device according to embodiments of the present disclosure.

FIG. 15 is a schematic block diagram of a core network device 1400 according to embodiments of the present disclosure. As shown in FIG. 15, the core network device 1400 includes:

a processing unit 1410, configured to: in a process of handing over a radio access technology RAT of a terminal device from a first radio access network to a second radio access network, obtain a device identity of a target access network device under the second radio access network that the terminal device is to access, where the first radio access network and the second radio access network are under different communication protocol versions, and there is an overlapped area between a coverage area of the first radio access network and a coverage area of the second radio access network;

the processing unit 1410 is further configured to: if the device identity of the target access network device exists in a first set, determine that the RAT of the terminal device is being handed over from the first radio access network to the second radio access network for a purpose of performing a voice service, where the first set includes all access network device identities under the second radio access network in the overlapped area.

In an embodiment, the processing unit 1410 is further configured to determine that a flow/bearer with an ongoing voice service needs to be handed over to the second radio access network;

if the device identity of the target access network device exists in the first set and the processing unit 1410 determines that the flow/bearer with the ongoing voice service needs to be handed over to the second radio access network, the processing unit 1410 determines that the RAT of the terminal device is being handed over from the first radio access network to the second radio access network for the purpose of performing the voice service.

In an embodiment, the first set is pre-configured.

In an embodiment, the first radio access network is a new radio NR network, the second radio access network is a long term evolution LTE network, and the core network device 1400 is an access and mobility management function AMF device.

In an embodiment, the core network device 1400 further includes:

a sending unit 1420, configured to send indicating information to a second device, where the indicating information includes a voice identifier and/or a pre-handover public land mobile network PLMN identifier, and the indicating information is used for indicating to the second device that the RAT of the terminal device is being handed over from the NR network to the LTE network for the purpose of performing the voice service.

In an embodiment, the RAT of the terminal device is handed over from the NR network to the LTE network in a first handover mode, where in the first handover mode, a core network 5GC for the NR network remains unchanged, and the 5GC serving the NR network simultaneously serves the LTE network; and the sending unit 1420 is specifically configured to:
send the indicating information to a session management function SMF device.

In an embodiment, the RAT of the terminal device is handed over from the NR network to the LTE network in a second handover mode, where in the second handover mode, a 5GC for the NR network remains unchanged, an AMF of the 5GC is switched from a source AMF to a target AMF, and the 5GC serving the NR network simultaneously serves the LTE network; and the sending unit 1420 is specifically configured to:
send the indicating information to the target AMF device.

In an embodiment, the RAT of the terminal device is handed over from the NR network to the LTE network in a third handover mode, where a 5GC for the NR network is switched to an evolved packet core EPC for the LTE network in the third handover mode; and the sending unit 1420 is specifically configured to:
send the indicating information to a mobile management entity MME device.

It should be understood that the core network device 1400 according to the embodiments of the present disclosure can correspond to the first device in the method 200 of the present disclosure, and the above and other operations and/or functions of the units in the core network device 1400 are intended to implement the corresponding processes of the first device in the method 200 as shown in FIG. 2, respectively, which will not be repeated here for the sake of brevity.

Figure 16:
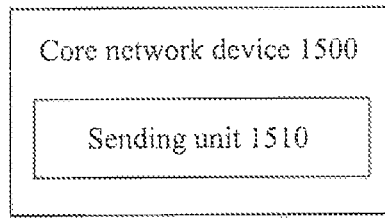
FIG. 16 is a schematic block diagram of another core network device according to embodiments of the present disclosure.

FIG. 16 is a schematic block diagram of a core network device 1500 according to embodiments of the present disclosure. As shown in FIG. 16, the core network device 1500 includes:

a sending unit 1510, configured to: after a radio access technology RAT of a terminal device is handed over from a first radio access network to a second radio access network, send indicating information for deleting a current bearer/flow to an access network device, where the indicating information includes a pre-handover public land mobile network PLMN identifier and/or a pre-handover access network device identity, the first radio access network and the second radio access network are under different communication protocol versions, and there is an overlapped area between a coverage area of the first radio access network and a coverage area of the second radio access network.

In an embodiment, the current bearer/flow is a bearer/flow used for performing a voice service.

In an embodiment, the first radio access network is a new radio NR network, the second radio access network is a long term evolution LTE network, the core network device is an access and mobility management function AMF device or a mobile management entity MME device, and the access network device is a base station gNB for the NR network.

In an embodiment, the core network device 1500 further includes:

a processing unit 1520, configured to obtain the pre-handover PLMN identifier and/or the pre-handover access network device identity.

In an embodiment, if the core network device is the AMF device and the RAT of the terminal device is handed over from the NR network to the LTE network in a first handover mode, where in the first handover mode, a core network 5GC for the NR network remains unchanged, and the 5GC serving the NR network simultaneously serves the LTE network, the processing unit 1520 is specifically configured to:
obtain the pre-handover PLMN identifier and/or the pre-handover access network device identity from a pre-handover access network device.

In an embodiment, if the core network device is the AMF device and the RAT of the terminal device is handed over from the NR network to the LTE network in a second handover mode, where in the second handover mode, a 5GC for the NR network remains unchanged, an AMF of the 5GC is switched from a source AMF to a target AMF, and the 5GC serving the NR network simultaneously serves the LTE network, the processing unit 1520 is specifically configured to:
obtain the pre-handover PLMN identifier and/or the pre-handover access network device identity from the source AMF device.

In an embodiment, if the core network device is the MME device and the RAT of the terminal device is handed over from the NR network to the LTE network in a third handover mode, where a 5GC for the NR network is switched to an evolved packet core EPC for the LTE network in the third handover mode, the processing unit 1520 is specifically configured to:
obtain the pre-handover PLMN identifier and/or the pre-handover access network device identity from the AMF device.

It should be understood that the core network device 1500 according to the embodiments of the present disclosure can correspond to the first device in the method 300 of the present disclosure, and the above and other operations and/or functions of the units in the core network device 1500 are intended to implement the corresponding processes of the first device in the method 300 as shown in FIG. 4, respectively, which will not be repeated here for the sake of brevity.

Figure 17:
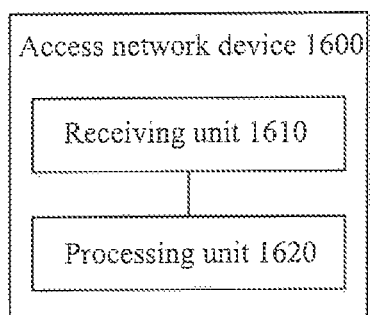
FIG. 17 is a schematic block diagram of an access network device according to embodiments of the present disclosure.

FIG. 17 is a schematic block diagram of an access network device 1600 according to embodiments of the present disclosure. As shown in FIG. 17, the access network device 1600 includes:

a receiving unit 1610, configured to: after a radio access technology RAT of a terminal device is handed over from a first radio access network to a second radio access network, receive indicating information for deleting a current bearer/flow from a first device, where the indicating information includes a pre-handover public land mobile network PLMN identifier and/or a pre-handover access network device identity, the first radio access network and the second radio access network are under different communication protocol versions, and there is an overlapped area between a coverage area of the first radio access network and a coverage area of the second radio access network; and a processing unit 1620, configured to: after the current bearer is deleted according to the indicating information, determine, according to the pre-handover PLMN identifier and/or the pre-handover access network device identity, to trigger the RAT of the terminal device to return from the second radio access network to the first radio access network.

In an embodiment, the current bearer/flow is a current bearer/flow used for performing a voice service.

In an embodiment, the first radio access network is a new radio NR network, the second radio access network is a long term evolution LTE network, the access network device is a base station gNB for the NR network, and the first device is an access and mobility management function AMF device or a mobile management entity MME device.

It should be understood that the access network device 1600 according to the embodiments of the present disclosure can correspond to the access network device in the method 400 of the present disclosure, and the above and other operations and/or functions of the units in the access network device 1600 are intended to implement the corresponding processes of the access network device in the method 400 as shown in FIG. 5, respectively, which will not be repeated here for the sake of brevity.

Figure 18:
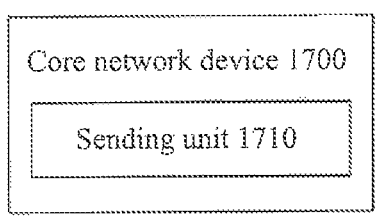
FIG. 18 is a schematic block diagram of still another core network device according to embodiments of the present disclosure.

FIG. 18 is a schematic block diagram of a core network device 1700 according to embodiments of the present disclosure. As shown in FIG. 18, the core network device 1700 includes:

a sending unit 1710, configured to send a handover indication to the access network device after a radio access technology RAT of a terminal device is handed over from a first radio access network to a second radio access network, where the handover indication is used for indicating the access network device to trigger the RAT of the terminal device to return from the second radio access network to the first radio access network, and the first radio access network and the second radio access network are networks under different communication protocol versions.

In an embodiment, when the terminal device needs to perform a voice service, the RAT of the terminal device is handed over from the first radio access network to the second radio access network.

In an embodiment, after the RAT of the terminal device is handed over from the first radio access network to the second radio access network and before the sending unit 1710 sends the handover indication to the access network device, the core network device 1700 further includes:

a processing unit 1710, configured to trigger the access network device to establish a first bearer/flow for the terminal device, where the first bearer/flow is used for performing a voice service under the second radio access network.

In an embodiment, the first radio access network is a new radio NR network, the second radio access network is a long term evolution LTE network, the core network device is an access and mobility management function AMF device or a session management function SMF device or a session management function+core packet gateway SMF+PGW-C device, and the access network device is an evolved universal terrestrial radio access network E-UTRAN device, and the sending unit 1710 is specifically configured to:
send the handover indication to the E-UTRAN device.

It should be understood that the core network device 1700 according to the embodiments of the present disclosure can correspond to the first device in the method 500 of the present disclosure, and the above and other operations and/or functions of the units in the core network device 1700 are intended to implement the corresponding processes of the first device in the method 500 as shown in FIG. 6, respectively, which will not be repeated here for the sake of brevity.

Figure 19:
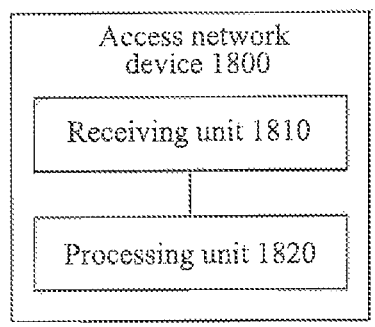
FIG. 19 is a schematic block diagram of another access network device according to embodiments of the present disclosure.

FIG. 19 is a schematic block diagram of an access network device 1800 according to embodiments of the present disclosure. As shown in FIG. 19, the access network device 1800 includes:

a receiving unit 1810, configured to: after a radio access technology RAT of a terminal device is handed over from a first radio access network to a second radio access network, receive a handover indication from a first device, where the handover indication is used for indicating the access network device to trigger the RAT of the terminal device to return from the second radio access network to the first radio access network, and the first radio access network and the second radio access network are under different communication protocol versions; and a processing unit 1820, configured to trigger, according to the handover indication, the RAT of the terminal device to return from the second radio access network to the first radio access network.

In an embodiment, when the terminal device needs to perform a voice service, the RAT of the terminal device is handed over from the first radio access network to the second radio access network.

In an embodiment, the first radio access network is a new radio NR network, the second radio access network is a long term evolution LTE network, the first device is an access and mobility management function AMF device or a session management function SMF device, and the access network device is an evolved universal terrestrial radio access network E-UTRAN device, and the receiving unit 1810 is specifically configured to:
receive the handover indication from the AMF device or the SMF device.

In an embodiment, the processing unit 1820 is specifically configured to:

trigger, in a first handover mode and according to the handover indication, the RAT of the terminal device to return from the second radio access network to the first radio access network, where a core network 5GC for the NR network remains unchanged in the first handover mode.

In an embodiment, the first radio access network is the NR network, the second radio access network is the LTE network, the first device is a session management function+core packet gateway SMF+PGW-C device, and the access network device is the E-UTRAN device; and the receiving unit 1810 is specifically configured to:
receive the handover indication from the SMF+PGW-C device.

In an embodiment, the processing unit 1820 is specifically configured to:

trigger, in a second handover mode and according to the handover indication, the RAT of the terminal device to return from the second radio access network to the first radio access network, where an evolved packet core EPC for the LTE network is switched back to the 5GC for the NR network in the second handover mode.

It should be understood that the access network device 1800 according to the embodiments of the present disclosure can correspond to the access network device in the method 600 of the present disclosure, and the above and other operations and/or functions of the units in the access network device 1800 are intended to implement the corresponding processes of the access network device in the method 600 as shown in FIG. 7, respectively, which will not be repeated here for the sake of brevity.

Figure 20:
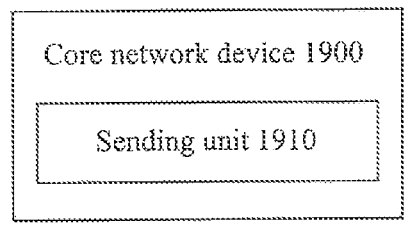
FIG. 20 is a schematic block diagram of still another core network device according to embodiments of the present disclosure.

FIG. 20 is a schematic block diagram of a core network device 1900 according to embodiments of the present disclosure. As shown in FIG. 20, the core network device 1900 includes:

a sending unit 1910, configured to: after a radio access technology RAT of a terminal device is handed over from a first radio access network to a second radio access network and the terminal device completes a voice service under the second radio access network, send indicating information for deleting a voice service bearer to an access network device, where the indicating information indicates to the access network device that a current bearer is used for the voice service, and the first radio access network and the second radio access network are under different communication protocol versions.

In an embodiment, the first radio access network is a new radio NR network, the second radio access network is a long term evolution LTE network, the core network device is an access and mobility management function AMF device or a session management function SMF device or a session management function+core packet gateway SMF+PGW-C device, and the access network device is an evolved universal terrestrial radio access network E-UTRAN device; and the sending unit 1910 is specifically configured to:
send the indicating information to the E-UTRAN device.

It should be understood that the core network device 1900 according to the embodiments of the present disclosure can correspond to the first device in the method 700 of the present disclosure, and the above and other operations and/or functions of the units in the core network device 1900 are intended to implement the corresponding processes of the first device in the method 700 as shown in FIG. 8, respectively, which will not be repeated here for the sake of brevity.

Figure 21:
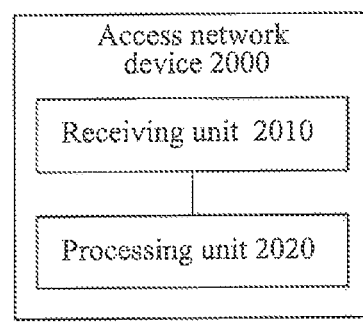
FIG. 21 is a schematic block diagram of still another access network device according to embodiments of the present disclosure.

FIG. 21 is a schematic block diagram of an access network device 2000 according to embodiments of the present disclosure. As shown in FIG. 21, the access network device 2000 includes:

a receiving unit 2010, configured to: after a radio access technology RAT of a terminal device is handed over from a first radio access network to a second radio access network and the terminal device completes a voice service under the second radio access network, receive indicating information for deleting a voice service bearer from a first device, where the indicating information indicates to the access network device that a current bearer is used for the voice service, and the first radio access network and the second radio access network are under different communication protocol versions; and a processing unit 2020, configured to: after the current bearer is deleted according to the indicating information, trigger the RAT of the terminal device to return from the second radio access network to the first radio access network.

In an embodiment, the first radio access network is a new radio NR network, the second radio access network is a long term evolution LTE network, the first device is an access and mobility management function AMF device or a session management function SMF device or a session management function+core packet gateway SMF+PGW-C device, and the access network device is an evolved universal terrestrial radio access network E-UTRAN device; and the receiving unit 2010 is specifically configured to:
receive the indicating information from the AMF device or the SMF device or the SMF+PGW-C device.

In an embodiment, if the access network device is currently connected to a core network 5GC for the NR network, the processing unit 2020 is specifically configured to:

trigger, in a first handover mode, the RAT of the terminal device to return from the second radio access network to the first radio access network,
where the core network 5GC for the NR network remains unchanged in the first handover mode.

In an embodiment, if the access network device is currently connected to an evolved packet core (EPC) for the LTE network,
the processing unit 2020 is specifically configured to:
trigger, in a second handover mode, the RAT of the terminal device to be handed over from the second radio access network back to the first radio access network,
where the EPC for the LTE network is switched back to the 5GC for the NR network in the second handover mode.

It should be understood that the access network device 2000 according to the embodiments of the present disclosure can correspond to the access network device in the method 800 of the present disclosure, and the above and other operations and/or functions of the units in the access network device 2000 are intended to implement the corresponding processes of the access network device in the method 800 as shown in FIG. 9, respectively, which will not be repeated here for the sake of brevity.

Figure 22:
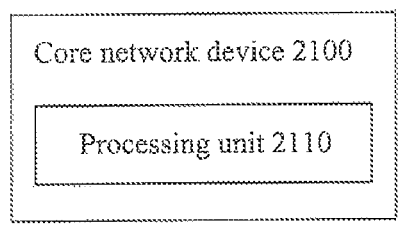
FIG. 22 is a schematic block diagram of still another core network device according to embodiments of the present disclosure.

FIG. 22 is a schematic block diagram of a core network device 2100 according to embodiments of the present disclosure. As shown in FIG. 22, the core network device 2100 includes:

a processing unit 2110, configured to obtain a fallback identifier in a process of handing over a radio access technology RAT of a terminal device from a first radio access network to a second radio access network, where the fallback identifier is used for indicating a purpose of handing over the RAT of the terminal device from the first radio access network to the second radio access network, and the first radio access network and the second radio access network are under different communication protocol versions.

In an embodiment, the fallback identifier indicates that the purpose of handing over the RAT of the terminal device from the first radio access network to the second radio access network is to establish for the terminal device a voice service under the second radio access network.

In an embodiment, the processing unit 2110 is specifically configured to:
obtain the fallback identifier in a process of handing over the RAT of the terminal device from the first radio access network to the second radio access network in a first handover mode, where in the first handover mode, a core network for the first radio access network remains unchanged, an internal network element of the core network remains unchanged, and the core network serving the first radio access network simultaneously serves the second radio access network.

In an embodiment, the first radio access network is a new radio NR network, the second radio access network is a long term evolution LTE network, and in the first handover mode, a core network 5GC for the NR network remains unchanged, an access and mobility management function AMF of the 5GC remains unchanged, and the 5GC serving the NR network simultaneously serves the LTE network.

In an embodiment, the core network device is an AMF device, and
the processing unit 2110 is specifically configured to:
receive the fallback identifier from an access network device.

In an embodiment, after the processing unit receives the fallback identifier from the access network device, the core network device further includes:

a sending unit 2120, configured to send the fallback identifier to a session management function SMF.

In an embodiment, the processing unit 2110 is specifically configured to:

obtain the fallback identifier in a process of handing over the RAT of the terminal device from the first radio access network to the second radio access network in a second handover mode, where in the second handover mode, a core network for the first radio access network remains unchanged, an internal network element of the core network changes, and the core network serving the first radio access network simultaneously serves the second radio access network.

In an embodiment, the first radio access network is the NR network, the second radio access network is the LTE network, and in the second handover mode, a 5GC for the NR network remains unchanged, an AMF of the 5GC is switched from a source AMF to a target AMF, and the 5GC serving the NR network simultaneously serves the LTE network.

In an embodiment, the core network device is an SMF device, and the processing unit 2110 is specifically configured to:

receive the fallback identifier from an access network device.

In an embodiment, the processing unit 2110 is specifically configured to:

receive the fallback identifier forwarded by the target AMF device from the source AMF device, where the fallback identifier is obtained by the source AMF device from the access network device.

In an embodiment, the processing unit 2110 is specifically configured to:

obtain the fallback identifier in a process of handing over the RAT of the terminal device from the first radio access network to the second radio access network in a third handover mode, where a core network for the first radio access network is switched to a core network for the second radio access network in the third handover mode.

In an embodiment, the first radio access network is the NR network, the second radio access network is the LTE network, and a 5GC for the NR network is switched to an evolved packet core (EPC) for the LTE network in the third handover mode.

In an embodiment, the core network device is a session management function+core packet gateway (SMF+PGW-C) device, and the processing unit 2110 is specifically configured to:

receive the fallback identifier from the access network device.

In an embodiment, the processing unit 2110 is specifically configured to:

receive the fallback identifier forwarded by an AMF device from the access network device.

It should be understood that the core network device 2100 according to the embodiments of the present disclosure can correspond to the first device in the method 900 of the present disclosure, and the above and other operations and/or functions of the units in the core network device 2100 are intended to implement the corresponding processes of the first device in the method 900 as shown in FIG. 10, respectively, which will not be repeated here for the sake of brevity.

Figure 23:
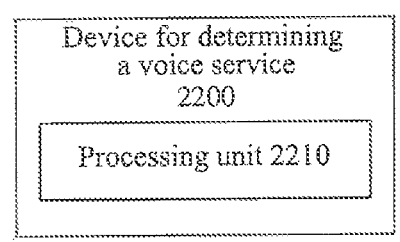
FIG. 23 is a schematic block diagram of a device for determining a voice service according to embodiments of the present disclosure.

FIG. 23 is a schematic block diagram of a device 2200 for determining a voice service according to embodiments of the present disclosure. As shown in FIG. 23, the device 2200 for determining a voice service includes:

a processing unit 2210, configured to obtain first information which is used for indicating that a first bearer/flow for a terminal device is not successfully established, where the first bearer/flow is used for performing a voice service under a first radio access network;

the processing unit 2210 is further configured to: after a radio access technology RAT of the terminal device is handed over from the first radio access network to a second radio access network, establish a second bearer/flow for the terminal device, where the first radio access network and the second radio access network are under different communication protocol versions;

the processing unit 2210 is further configured to determine that the second bearer/flow is used for performing a voice service under the second radio access network.

In an embodiment, the processing unit 2210 is further configured to: after the second bearer/flow is released, trigger the RAT of the terminal device to return from the second radio access network to the first radio access network.

In an embodiment, a purpose of handing over the RAT of the terminal device from the first radio access network to the second radio access network is to establish the second bearer/flow.

In an embodiment, the RAT of the terminal device is handed over from the first radio access network to the second radio access network in a first handover mode, where in the first handover mode, a core network for the first radio access network remains unchanged, an internal network element of the core network remains unchanged, and the core network serving the first radio access network simultaneously serves the second radio access network.

In an embodiment, the first radio access network is a new radio NR network, the second radio access network is a long term evolution LTE network, and in the first handover mode, a core network 5GC for the NR network remains unchanged, an access and mobility management function AMF of the 5GC remains unchanged, and the 5GC serving the NR network simultaneously serves the LTE network.

In an embodiment, the RAT of the terminal device is handed over from the first radio access network to the second radio access network in a second handover mode, where in the second handover mode, a core network for the first radio access network remains unchanged, an internal network element of the core network changes, and the core network serving the first radio access network simultaneously serves the second radio access network.

In an embodiment, the first radio access network is the NR network, the second radio access network is the LTE network, and in the second handover mode, a core network 5GC for the NR network remains unchanged, an AMF of the 5GC is switched from a source AMF to a target AMF, and the 5GC serving the NR network simultaneously serves the LTE network.

In an embodiment, the first bearer/flow is a flow with a quality of service identifier 5QI=1, and the second bearer/flow is a flow with 5QI=1.

In an embodiment, the RAT of the terminal device is handed over from the first radio access network to the second radio access network in a third handover mode, where a core network for the first radio access network is switched to a core network for the second radio access network in the third handover mode.

In an embodiment, the first radio access network is the NR network, the second radio access network is the LTE network, and a 5GC for the NR network is switched to an evolved packet core (EPC) for the LTE network in the third handover mode.

In an embodiment, the first bearer/flow is a flow with a quality of service identifier 5QI=1, and the second bearer/flow is a bearer with a quality of service class identifier QCI=1.

It should be understood that the device 2200 for determining a voice service according to the embodiments of the present disclosure can correspond to the device in the method 1000 of the present disclosure, and the above and other operations and/or functions of the units in the device 2200 for determining a voice service are intended to implement the corresponding processes of the device in the method 1000 as shown in FIG. 11, respectively, which will not be repeated here for the sake of brevity.

Figure 24:
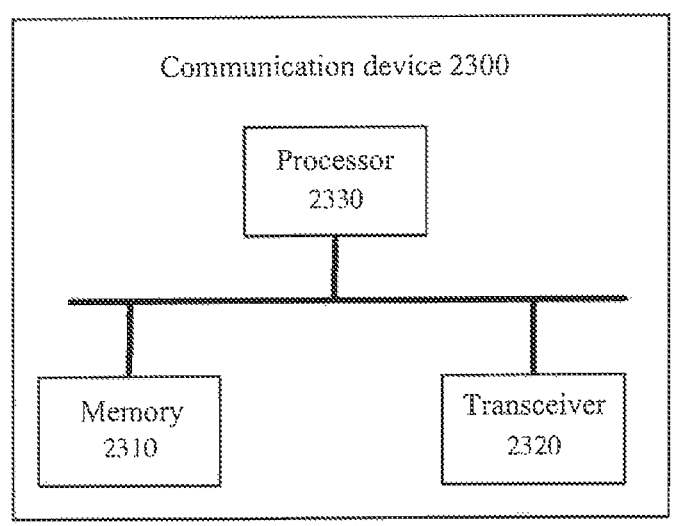
FIG. 24 illustrates a schematic block diagram of a communication device provided by embodiments of the present disclosure.

FIG. 24 illustrates a schematic block diagram of a communication device 2300 according to embodiments of the present disclosure, where the device 2300 includes:

a memory 2310, configured to store a program including codes;

a transceiver 2320, configured to communicate with other devices; and a processor 2330, configured to execute program codes in the memory 2310.

The transceiver 2320 is configured to perform specific signal transmitting and receiving under the driving of the processor 2330.

In an embodiment, when the codes are executed, the processor 2330 can implement the various operations performed by the core network device (i.e., the first device) in the method 200 in FIG. 2, the method 300 in FIG. 4, the method 500 in FIG. 6, the method 700 in FIG. 8, or the method 900 in FIG. 10, which will not be repeated here for the sake of brevity. At this time, the device 2300 can be a core network device (e.g., an AMF or an SMF or a PGW-C+SMF).

In an embodiment, when the codes are executed, the processor 2330 can implement the various operations performed by the access network device in the method 400 in FIG. 5, the method 600 in FIG. 7, or the method 800 in FIG. 9, which will not be repeated here for the sake of brevity. At this time, the device 2300 can be an access network device (e.g., a base station).

In an embodiment, when the codes are executed, the processor 2330 can also implement the various operations performed by the device in the method 1000 in FIG. 11, which will not be repeated here for the sake of brevity.

It should be understood that, in the embodiments of the present disclosure, the processor 2330 may be a central processing unit (Central Processing Unit, CPU). The processor 2330 may also be other general-purpose processor, a digital signal processor (Digital Signal Processor, DSP), an application specific integrated circuit (Application Specific Integrated Circuit, ASIC), a field programmable gate array (Field Programmable Gate Array, FPGA) or other programmable logic element, a discrete gate or a transistor logic element, a discrete hardware component or the like. The general-purpose processor may be a microprocessor or any conventional processor or the like.

The memory 2310 can include a read-only memory and a random access memory, and can provide instructions and data to the processor 2330. A part of the memory 2310 can further include a non-volatile random access memory. For example, the memory 2310 can also store information about a device type.

The transceiver 2320 can be configured to implement signal transmitting and receiving functions, such as frequency modulation and demodulation functions, or frequency up-converting and down-converting functions.

In an implementation process, at least one step of the foregoing methods may be completed by an integrated logic circuit of hardware in the processor 2330, or the integrated logic circuit may complete the at least one step by being driven by instructions in a software form. Therefore, the communication device 2300 may be a chip or a chipset. The steps of the methods disclosed with reference to the embodiments of the present disclosure may be directly embodied by the execution of the hardware processor or by a combination of hardware and software modules in the processor. The software modules may be located in a random access memory, a flash memory, a read-only memory, a programmable read-only memory or an electrically erasable programmable memory, a register or other mature storage medium in the art. The storage medium is located in the memory. The processor 2330 reads the information in the memory and, in conjunction with the hardware, accomplishes the steps of the above methods. To avoid repetition, none of the above will be detailed here.

Figure 25:
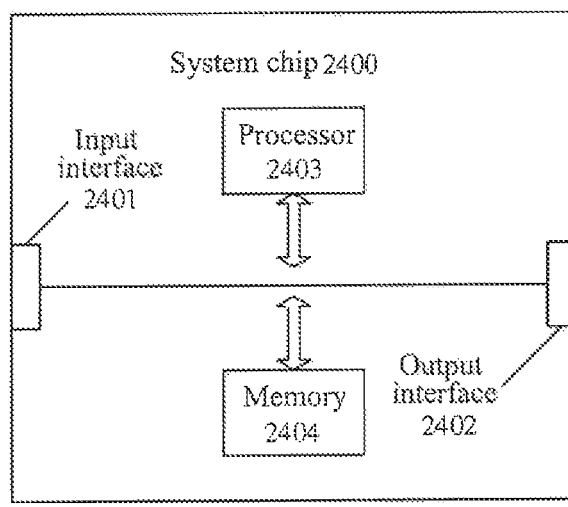
FIG. 25 is a schematic structural diagram of a system chip according to embodiments of the present disclosure.

FIG. 25 is a schematic structural diagram of a system chip 2400 according to embodiments of the present disclosure. The system chip 2400 in FIG. 25 includes an input interface 2401, an output interface 2402, a processor 2403 and a memory 2404 which are interconnected via internal communication connection lines, and the processor 2403 is configured to execute codes in the memory 2404.

In an embodiment, when the codes are executed, the processor 2403 implements the methods executed by the core network device in the method embodiments. For the sake of brevity, no such content will be repeated here.

In an embodiment, when the codes are executed, the processor 2403 implements the methods executed by the access network device in the method embodiments. For the sake of brevity, no such content will be repeated here.

In an embodiment, when the codes are executed, the processor 2403 implements the methods executed by the device for determining a voice service in the method embodiments. For the sake of brevity, no such content will be repeated here.

Those of ordinary skill in the art may realize that, units and algorithm steps that embody various examples as described in the embodiments disclosed herein may be implemented using electronic hardware, or a combination of computer software and electronic hardware. Whether the functions are to be carried out by means of hardware or software would depend on the specific application of the technical solution as well as design constraints. Those skilled in the art may implement the functions described herein using different approaches for individual applications, but such implementations should not be deemed as beyond the scope of the present disclosure.

Those skilled in the art may clearly appreciate that, for the purpose of convenience and conciseness in the description, the specific operating process of the systems, apparatuses and units as described above may be understood by referring to the corresponding processes in the foregoing method embodiments, which will not be repeated here.

In the embodiments provided in the present disclosure, it should be understood that the disclosed systems, apparatuses and methods may be implemented by other means. For instance, the apparatus embodiments described above are merely illustrative. For instance, the units are divided by their logical functions only, and other division manners are possible in practical implementation. For instance, multiple units or components may be combined, or be integrated with another system, or some features may be omitted or skipped. In addition, the inter-couplings illustrated or discussed, whether a direct coupling or communication connection, may be an indirect coupling or communication connection via some interfaces, apparatuses or units, and may be electrical, mechanical or otherwise.

The units described as separate components may or may not be physically separated, and the component displayed as a unit may or may not be a physical unit, that is, they may be located at one place, or may be distributed to multiple network elements. Some or all of the units may be selected according to actual needs to achieve the purpose of the solutions of the embodiments.

In addition, various functional units in various embodiments of the present disclosure may be integrated into a single processing unit, or be physically separated into stand-alone units, or two or more units may be integrated into one unit.

When the functions are implemented in the form of the software functional units and traded or used as a standalone product, they may be stored in a computer readable storage medium. Based on such understanding, the essence, or the part contributing to prior art, or part, of the technical solutions of the present disclosure may manifest in the form of software product. The computer software product described above may be stored in a storage medium and include instructions for causing a computing device (which may be a personal computer, a server, or a network device, etc.) to implement some or all of the steps in the methods of the various embodiments of the present disclosure. The storage medium includes mediums capable of storing program codes, such as a USB disk, a portable hard disk, a read-only memory (Read-Only Memory, ROM), a random access memory (Random Access Memory, RAM), a magnetic disk, or an optical disk, or the like, which may store program codes.

The above descriptions are merely specific implementations of the present disclosure, and the protection scope of the present disclosure shall not be limited thereto. Any one skilled in the art may, within the technical scope disclosed in the present disclosure, readily think of variations or substitutions, which shall also fall under the protection scope of the present disclosure. Therefore, the protection scope of the present disclosure shall be in accordance with the protection scope of the claims.

What is claimed is:

1. A communication method, comprising:
    receiving, by a core network device, a fallback identifier originated from an access network device in a first radio access network when radio access technology (RAT) of a terminal device is falling back from RAT of the first radio access network to RAT of a second radio access network, wherein the fallback is triggered by a need to establish a voice service for the terminal device, and the fallback identifier indicates that establishing a first bearer/flow for the voice service under the first radio access network is not successful, wherein the first radio access network is a new radio (NR) network, and the second radio access network is a long term evolution (LIE) network;
    determining, by the core network device according to the fallback identifier, that the fallback of the RAT of the terminal device from the RAT of the first radio access network to the RAT of the second radio access network is for establishing for the terminal device the voice service under the second radio access network; and
    in response to the fallback identifier, establishing, by the core network device, a second bearer/flow for the voice service under the second radio access network after the RAT of the terminal device falls back from the RAT of the first radio access network to the RAT of the second radio access network.

2. The method according to claim 1, wherein receiving the fallback identifier comprises:
    receiving, by the core network device, the fallback identifier in a first fallback mode,
    wherein the first fallback mode is that during the fallback of the RAT of the terminal device from the RAT of the first radio access network to the RAT of the second radio access network, a core network simultaneously serves the first radio access network and the second radio access network.

3. The method according to claim 2, wherein in the first fallback mode, a fifth generation core network (5GC) simultaneously serves the NR network and the LTE network.

4. The method according to claim 3, wherein the core network device is an access and mobility function (AMF) device, and the receiving, by the core network device, the fallback identifier comprises:
    receiving, by the AMF device, the fallback identifier from the access network device in the first radio access network.

5. The method according to claim 4, wherein after the receiving, by the AMF device, the fallback identifier from the access network device in the first radio access network, the method further comprises:
    sending, by the AMF device, the fallback identifier to a session management function (SMF).

6. The method according to claim 1, wherein receiving the fallback identifier comprises:
    receiving, by the core network device, the fallback identifier in a third fallback mode,
    wherein the third fallback mode is that during the fallback of the RAT of the terminal device from the RAT of the first radio access network to the RAT of the second radio access network, a core network for the first radio access network is switched to a core network for the second radio access network.

7. The method according to claim 6, wherein in the third fallback mode, a fifth generation core (5GC) for the NR network is switched to an evolved packet core (EPC) for the LTE network.

8. The method according to claim 7, wherein the core network device is a session management function+core packet gateway (SMF+PCW-C) device, and the receiving, by the core network device, the fallback identifier comprises:
    receiving, by the SMF+PGW-C device, the fallback identifier from the access network device in the first radio access network.

9. The method according to claim 8, wherein the receiving, by the SMF+PGW-C device, the fallback identifier from the access network device in the first radio access network comprises:
    receiving, by the SMF+PGW-C device, the fallback identifier forwarded by an access and mobility function A) device from the access network device in the first radio access network.

10. A network device, comprising a processor, a memory configured to store instructions, and a communication interface configured to communicate with other network elements under control of the processor, wherein an execution of the instructions causes the processor to:
- obtain a fallback identifier originated from an access network device in a first radio access network when radio access technology (RAT) of a terminal device is falling back from RAT of the first radio access network to RAT of a second radio access network, wherein the fallback is triggered by a need to establish a voice service for the terminal device, and the fallback identifier indicates that establishing a first bearer/flow for the voice service under the first radio access network is not successful, wherein the first radio access network is a new radio (NR) network, the second radio access network is a long term evolution (LTE) network;
- determine, according: to the fallback identifier, that the fallback of the RAT of the terminal device from the RAT of the first radio access network to the RAT of the second radio access network is for establishing, for the terminal device the voice service under the second radio access network; and
- in response to the fallback identifier, establishing, by the core network device, a second bearer/flow for the voice service under the second radio access network after the RAT of the terminal device falls back from the RAT of the first radio access network to the RAT of the second radio access network.

11. The network device according to claim 10, wherein in receiving the fallback identifier through the communication interface, the processor is configured to:
- receive the fallback identifier in a first fallback mode, wherein the first fallback mode is that during the fallback of the RAT of the terminal device from the RAT of the first radio access network to the RAT of the second radio access network, a core network simultaneously serves the first radio access network and the second radio access network.

12. The network device according to claim 11, wherein in the first fallback mode, a fifth generation core network (5GC) simultaneously serves the NR network and the LTE network.

13. The network device according to claim 12, wherein the network device is an access and mobility function (AMP) device, and the processor is configured to:
- receive the fallback identifier from the access network device in the first radio access network through the communication interface.

14. The network device according to claim 13, wherein after the fallback identifier is received from the access network device, the processor is further configured to:
- send the fallback identifier to a session management function (SMF) through the communication interface.

15. The network device according to claim 10, wherein in receiving the fallback identifier, the processor is configured to:
- receive the fallback identifier in a third fallback mode, wherein the third fallback mode is that during the fallback of the RAT of the terminal device from the RAT of the first radio access network to the RAT of the second radio access network, a core network for the first radio access network is switched to a core network for the second radio access network.

16. The network device according to claim 15, wherein in the third fallback mode, a fifth generation core (5GC) for the NR network is switched to an evolved packet core (EPC) for the LTE network.

17. The network device according to claim 16, wherein the network device is a session management function+core packet gateway (SMF+PGW-C) device, and in receiving the fallback identifier, the processor is configured to:
- receive the fallback identifier from the access network device in the first radio access network through the communication interface.

18. The network device according to claim 17, wherein in receiving the fallback identifier, the processor is configured to:
- receive, through the communication interface, the fallback identifier forwarded by an access and mobility function (AMF) device from the access network device in the first radio access network.

* * * * *